United States Patent [19]

Diachina et al.

[11] Patent Number: 6,041,047
[45] Date of Patent: Mar. 21, 2000

[54] DIGITAL CONTROL CHANNELS HAVING LOGICAL CHANNELS SUPPORTING BROADCAST SMS

[75] Inventors: John W. Diachina, Garner, N.C.; Bengt Persson, Djursholm, Sweden; Alex K. Raith, Durham; Anthony J. Sammarco, Garner, both of N.C.

[73] Assignee: Telefonaktiebolaget LM Ericsson, Stockholm, Sweden

[21] Appl. No.: 09/075,203

[22] Filed: May 11, 1998

Related U.S. Application Data

[63] Continuation-in-part of application No. 08/147,254, Nov. 1, 1993, Pat. No. 5,603,081, and a continuation-in-part of application No. 07/956,640, Oct. 5, 1992, Pat. No. 5,404,355, and a continuation of application No. 08/482,754, Jun. 7, 1995, Pat. No. 5,768,276, which is a continuation-in-part of application No. 08/331,703, Oct. 31, 1994, Pat. No. 5,604,744.

[51] Int. Cl.[7] .................................................. H04B 7/212
[52] U.S. Cl. ............................................................. 370/347
[58] Field of Search .................................... 370/321, 328, 370/338, 329, 341, 347, 348, 431, 442; 455/422

[56] References Cited

U.S. PATENT DOCUMENTS

| | | | |
|---|---|---|---|
| 4,797,654 | 1/1989 | Young et al. | 341/50 |
| 4,815,073 | 3/1989 | Grauel et al. | . |
| 5,081,704 | 1/1992 | Umeda et al. | 455/33 |
| 5,127,100 | 6/1992 | D'Amico et al. | 455/33.1 |
| 5,193,091 | 3/1993 | Crisler et al. | 370/95.1 |

(List continued on next page.)

FOREIGN PATENT DOCUMENTS

| | | |
|---|---|---|
| 240 073 | 10/1987 | European Pat. Off. . |
| 291 068 | 11/1988 | European Pat. Off. . |
| 321 454 | 6/1989 | European Pat. Off. . |
| 445 887 | 9/1991 | European Pat. Off. . |
| 462 572 | 12/1991 | European Pat. Off. . |
| WO92/10042 | 6/1992 | WIPO . |
| WO92/14308 | 8/1992 | WIPO . |
| 505 106 | 9/1992 | WIPO . |

OTHER PUBLICATIONS

"Radio Link Control Techniques for Digital Cellular Systems", Seizo Onoe et al., NNT Review, vol. 4, No. 1, pp. 47–54 (Jan. 1992).

(List continued on next page.)

Primary Examiner—Ajit Patel
Attorney, Agent, or Firm—Burns, Doane, Swecker & Mathis, L.L.P.

[57] ABSTRACT

A communications system in which information is transmitted in successive time slots grouped into a plurality of superframes which are, in turn, grouped into a plurality of hyperframes. A remote station is assigned to one of the time slots in each of the superframes for paging the remote station, each hyperframe including at least two superframes, and the information sent in the assigned time slot in one superframe in each hyperframe is repeated in the assigned time slot in the other superframe(s) in each hyperframe. Each superframe can include a plurality of time slots used for sending paging messages to remote stations, grouped into a plurality of successive paging frames, and the time slot to which the remote station is assigned is included once in every paging frame. Also, each superframe may include time slots comprising a logical channel for broadcast control information and time slots comprising a logical paging channel. Information sent in the assigned time slot may direct the remote station to read the broadcast control information, and the information may have been encoded according to an error correcting code and include a plurality of bits having polarities that are inverses of cyclic redundancy check bits produced by the encoding. Also, the broadcast control information may comprise special messages that are included in respective time slots comprising a logical special message channel, the time slots of the special message channel may be grouped in successive SMS frames, and the SMS frames may be synchronized to start with a start of a superframe.

8 Claims, 9 Drawing Sheets

U.S. PATENT DOCUMENTS

| | | |
|---|---|---|
| 5,228,030 | 7/1993 | Dresher . |
| 5,325,088 | 6/1994 | Willard et al. .................... 340/825.2 |
| 5,353,332 | 6/1994 | Raith et al. ............................ 379/59 |
| 5,379,326 | 1/1995 | Nakahara et al. ................... 375/354 |
| 5,383,221 | 1/1995 | Akita et al. ......................... 455/422 |

OTHER PUBLICATIONS

"*Call Setup Strategy Tradeoofs for Universal Digital Portable Communications*", Yurdaer N. Doganata et al., Computer Networks and ISDN Systems, vol. 20, No. 1/5, pp. 455–464 (Dec. 1990).

"*Cellular System Dual–Mode Mobile Station—Base Station Compatability Standard*", EIA/TIA Interim Standard, IS–54–B, pp. 101–106; 109–116; and 163–166 (Apr. 1992).

"A New Standard for North American Digital Cellular," Magnus Isaksson et al., Ericsson Review, No. 2, 1994.

FIG. 5
| HYPERFRAME 0 SUPERFRAME 0 PRIMARY | | | | SUPERFRAME 1 SECONDARY | | | | HYPERFRAME 1 SUPERFRAME 2 PRIMARY | | | |
|---|---|---|---|---|---|---|---|---|---|---|---|
| F | $E^0$ | $S^0$ | $SPACH^0$ | F | $E^1$ | $S^1$ | $SPACH^0$ | F | $E^2$ | $S^2$ | $SPACH^1$ |
F = F-BCCH
E = E-BCCH
S = S-BCCH
SPACH = PCH OR ARCH OR SMSCH
FIG. 6
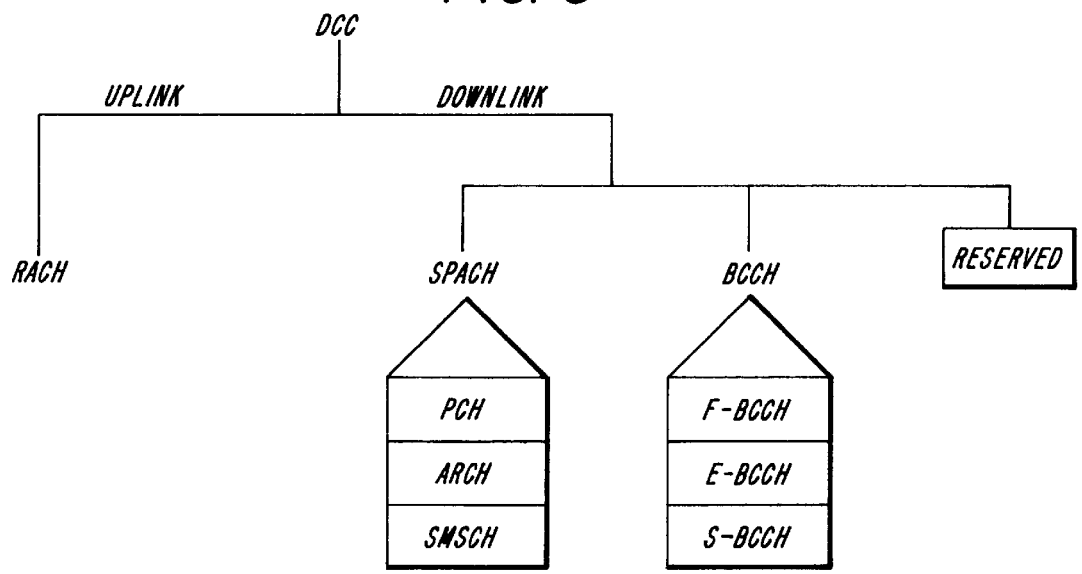
FIG. 7
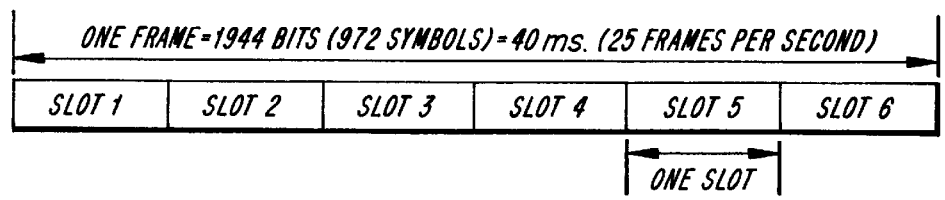

AG — ABBREVIATED GUARD TIME
BRI — BUSY/RESERVED/IDLE INDICATOR
CSFP — CODED SUPER FRAME PHASE
DATA — INFORMATION BITS
G — GUARD TIME
CPE — CODED PARTIAL ECHO
PREAM — PREAMBLE
R — RAMP TIME
R/N — RECEIVED/NOT RECEIVED
RSVD — RESERVED FIELD, SET TO 11
SYNC — SYNCHRONIZATION
SYNC+ — ADDITIONAL SYNCHRONIZATION

FIG. 9
| INFORMATION | CRC | TAIL |
|---|---|---|
| 109/101/79 | 16 | 5 |
FIG. 10
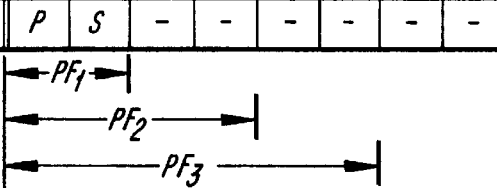
| $HF_n$ | 0 | | 1 | | 2 | | 3 | | 4 | | 5 | | 6 | |
|---|---|---|---|---|---|---|---|---|---|---|---|---|---|---|
| $SF_n$ | 0 | 1 | 2 | 3 | 4 | 5 | 6 | 7 | 8 | 9 | 10 | 11 | 12 | 13 |
| $PF_1$ | P | S | P | S | P | S | P | S | P | S | P | S | P | S |
| $PF_2$ | P | S | - | - | P | S | - | - | P | S | - | - | P | S |
| $PF_3$ | P | S | - | - | - | - | P | S | - | - | - | - | P | S |
| $PF_4$ | P | S | - | - | - | - | - | - | P | S | - | - | - | - |
HF = HYPERFRAME
SF = SUPERFRAME
PF = PAGING FRAME
P = PRIMARY PCHs
S = SECONDARY PCHs
FIG. 11
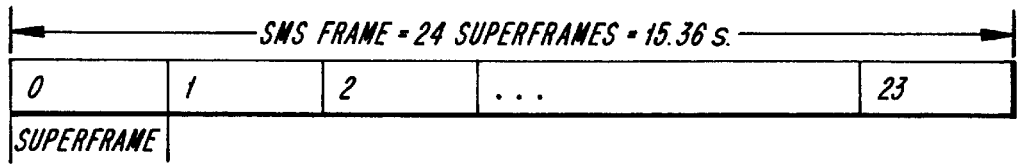
| 0 | 1 | 2 | ... | 23 |
|---|---|---|---|---|
| SUPERFRAME | | | | |
SMS FRAME = 24 SUPERFRAMES = 15.36 s.
FIG. 12
| S-BCCH: | SMS(1) | SMS(2) | SMS(3) | SMS(4) | SMS(1) | SMS(2) | ... |
|---|---|---|---|---|---|---|---|
| SPACH: | TF(2) | TF(3) | TF(4) | TF(1) | TF(2) | TF(3) | ... |
| | SMS FR. | | | | | | |

FIG. 13a

| SCS =X | BC =0 | L3LI =X...X | L3DATA =X...X | BE =1 | FILLER =0...0 | CRC =X...X |
|---|---|---|---|---|---|---|
| 1 | 1 | 8 | | 1 | | 16 |

FIG. 13b

| SCS =X | BC =0 | L3LI =X...X | L3DATA =X...X | BE =0 | L3LI =X...X | L3DATA =X...X | CRC =X...X |
|---|---|---|---|---|---|---|---|
| 1 | 1 | 8 | | 1 | 8 | | 16 |

FIG. 13c

| SCS =X | BC =1 | CLI =X...X | L3DATA =X...X | BE =1 | FILLER =0...0 | CRC =X...X |
|---|---|---|---|---|---|---|
| 1 | 1 | 7 | | 1 | | 16 |

FIG. 14a

| BC =0 | SID =7 | FDC =4 | SSI =1 | SCN =0 | L3LI =X...X | L3DATA =X...X | CRC =X...X |
|---|---|---|---|---|---|---|---|
| 1 | 5 | 8 | 1 | 1 | 8 | 85 | 16 |

FIG. 14b

| BC =1 | SID =7 | FDC =1 | SSI =0 | SCN =0 | CLI =X...X | L3DATA =X...X | BI =0 | FILLER =0...0 | CRC =X...X |
|---|---|---|---|---|---|---|---|---|---|
| 1 | 5 | 8 | 1 | 1 | 7 | | 1 | | 16 |

FIG. 14c

| BC =1 | SID =7 | FDC =3 | SSI =0 | SCN =0 | CLI =X...X | L3DATA =X...X | BI =1 | L3LI =X...X | L3DATA =X...X | CRC =X...X |
|---|---|---|---|---|---|---|---|---|---|---|
| 1 | 5 | 8 | 1 | 1 | 7 | | 1 | 8 | | 16 |

FIG. 14d

| BC =1 | SID =7 | FDC =2 | SSI =0 | SCN =0 | CLI =X...X | L3DATA =X...X | CRC =X...X |
|---|---|---|---|---|---|---|---|
| 1 | 5 | 8 | 1 | 1 | 7 | 86 | 16 |

DIGITAL CONTROL CHANNELS HAVING LOGICAL CHANNELS SUPPORTING BROADCAST SMS

This application is a continuation of application Ser. No. 08/482,754, filed Jun. 7, 1995, now U.S. Pat. No. 5,768,276, which is a continuation-in-part of U.S. patent application Ser. No. 08/331,703 now U.S. Pat. No. 5,604,944, entitled "Digital Control Channels Having Logical Channels for Multiple Access Radiocommunication", which was filed on Oct. 31, 1994 and which is incorporated in this application by reference. This parent application is a continuation in part of U.S. patent application Ser. No. 08/147,254 now U.S. Pat. No. 5,603,081, entitled "A Method for Communicating in a Wireless Communication System", which was filed on Nov. 1, 1993, and which is incorporated in this application by reference. The parent application is also a continuation in part of U.S. Patent application Ser. No. 07/956,640 now U.S. Pat. No. 5,404,355, entitled "Digital Control Channel", which was filed on Oct. 5, 1992, and which is incorporated in this application by reference.

BACKGROUND

Applicants' invention relates generally to radiocommunication systems that use digital control channels in a multiple access scheme and more particularly to cellular TDMA radiotelephone systems having digital control channels.

The growth of commercial radiocommunications and, in particular, the explosive growth of cellular radiotelephone systems have compelled system designers to search for ways to increase system capacity without reducing communication quality beyond consumer tolerance thresholds. One way to increase capacity is to use digital communication and multiple access techniques such as TDMA, in which several users are assigned respective time slots on a single radio carrier frequency.

In North America, these features are currently provided by a digital cellular radiotelephone system called the digital advanced mobile phone service (D-AMPS), some of the characteristics of which are specified in the interim standard IS-54B, "Dual-Mode Mobile Station-Base Station Compatibility Standard", published by the Electronic Industries Association and Telecommunications Industry Association (EIA/TIA). Because of a large existing consumer base of equipment operating only in the analog domain with frequency-division multiple access (FDMA), IS-54B is a dual-mode (analog and digital) standard, providing for analog compatibility in tandem with digital communication capability. For example, the IS-54B standard provides for both FDMA analog voice channels (AVC) and TDMA digital traffic channels (DTC), and the system operator can dynamically replace one type with the other to accommodate fluctuating traffic patterns among analog and digital users. The AVCs and DTCs are implemented by frequency modulating radio carrier signals, which have frequencies near 800 megahertz (MHz) such that each radio channel has a spectral width of 30 kilohertz (KHz).

In a TDMA cellular radiotelephone system, each radio channel is divided into a series of time slots, each of which contains a burst of information from a data source, e.g., a digitally encoded portion of a voice conversation. The time slots are grouped into successive TDMA frames having a predetermined duration. The number of time slots in each TDMA frame is related to the number of different users that can simultaneously share the radio channel. If each slot in a TDMA frame is assigned to a different user, the duration of a TDMA frame is the minimum amount of time between successive time slots assigned to the same user.

The successive time slots assigned to the same user, which are usually not consecutive time slots on the radio carrier, constitute the user's digital traffic channel, which may be considered a logical channel assigned to the user. As described in more detail below, digital control channels (DCCHs) can also be provided for communicating control signals, and such a DCCH is a logical channel formed by a succession of usually non-consecutive time slots on the radio carrier.

According to IS-54B, each TDMA frame consists of six consecutive time slots and has a duration of 40 milliseconds (msec). Thus, each radio channel can carry from three to six DTCs (e.g., three to six telephone conversations), depending on the source rates of the speech coder/decoders (codecs) used to digitally encode the conversations. Such speech codecs can operate at either full-rate or half-rate, with full-rate codecs being expected to be used until half-rate codecs that produce acceptable speech quality are developed. A full-rate DTC requires twice as many time slots in a given time period as a half-rate DTC, and in IS-54B, each radio channel can carry up to three full-rate DTCs or up to six half-rate DTCs. Each full-rate DTC uses two slots of each TDMA frame, i.e., the first and fourth, second and fifth, or third and sixth of a TDMA frame's six slots. Each half-rate DTC uses one time slot of each TDMA frame. During each DTC time slot, 324 bits are transmitted, of which the major portion, 260 bits, is due to the speech output of the codec, including bits due to error correction coding of the speech output, and the remaining bits are used for guard times and overhead signalling for purposes such as synchronization.

It can be seen that the TDMA cellular system operates in a buffer-and-burst, or discontinuous-transmission, mode: each mobile station transmits (and receives) only during its assigned time slots. At full rate, for example, a mobile station might transmit during slot 1, receive during slot 2, idle during slot 3, transmit during slot 4, receive during slot 5, and idle during slot 6, and then repeat the cycle during succeeding TDMA frames. Therefore, the mobile station, which may be battery-powered, can be switched off, or sleep, to save power during the time slots when it is neither transmitting nor receiving. In the IS-54B system in which the mobile does not transmit and receive simultaneously, a mobile can sleep for periods of at most about 27 msec (four slots) for a half-rate DTC and about 7 msec (one slot) for a full-rate DTC.

In addition to voice or traffic channels, cellular radiocommunication systems also provide paging/access, or control, channels for carrying call-setup messages between base stations and mobile stations. According to IS-54B, for example, there are twenty-one dedicated analog control channels (ACCs), which have predetermined fixed frequencies for transmission and reception located near 800 MHz. Since these ACCs are always found at the same frequencies, they can be readily located and monitored by the mobile stations.

For example, when in an idle state (i.e., switched on but not making or receiving a call), a mobile station in an IS-54B system tunes to and then regularly monitors the strongest control channel (generally, the control channel of the cell in which the mobile station is located at that moment) and may receive or initiate a call through the corresponding base station. When moving between cells while in the idle state, the mobile station will eventually "lose" radio connection on the control channel of the "old" cell and tune to the control channel of the "new" cell. The initial tuning and subsequent re-tuning to control channels are both accomplished automatically by scanning all the available control channels at their known frequencies to find the "best" control channel. When a control channel with good reception quality is found, the mobile station remains tuned to this channel until the quality deteriorates again. In this way, mobile stations stay "in touch" with the system. The ACCs specified in IS-54B require the mobile stations to remain continuously "awake" (or at least for a significant part of the time, e.g. 50%) in the idle state, at least to the extent that they must keep their receivers switched on.

While in the idle state, a mobile station must monitor the control channel for paging messages addressed to it. For example, when an ordinary telephone (land-line) subscriber calls a mobile subscriber, the call is directed from the public switched telephone network (PSTN) to a mobile switching center (MSC) that analyzes the dialed number. If the dialed number is validated, the MSC requests some or all of a number of radio base stations to page the called mobile station by transmitting over their respective control channels paging messages that contain the mobile identification number (MIN) of the called mobile station. Each idle mobile station receiving a paging message compares the received MIN with its own stored MIN. The mobile station with the matching stored MIN transmits a page response over the particular control channel to the base station, which forwards the page response to the MSC.

Upon receiving the page response, the MSC selects an AVC or a DTC available to the base station that received the page response, switches on a corresponding radio transceiver in that base station, and causes that base station to send a message via the control channel to the called mobile station that instructs the called mobile station to tune to the selected voice or traffic channel. A through-connection for the call is established once the mobile station has tuned to the selected AVC or DTC.

When a mobile subscriber initiates a call, e.g., by dialing the telephone number of an ordinary subscriber and pressing the "send" button on the mobile station, the mobile station transmits the dialed number and its MIN and an electronic serial number (ESN) over the control channel to the base station. The ESN is a factory-set, "unchangeable" number designed to protect against the unauthorized use of the mobile station. The base station forwards the received numbers to the MSC, which validates the mobile station, selects an AVC or DTC, and establishes a through-connection for the call as described above. The mobile may also be required to send an authentication message.

It will be understood that a communication system that uses ACCs has a number of deficiencies. For example, the format of the forward analog control channel specified in IS-54B is largely inflexible and not conducive to the objectives of modem cellular telephony, including the extension of mobile station battery life. In particular, the time interval between transmission of certain broadcast messages is fixed and the order in which messages are handled is also rigid. Also, mobile stations are required to re-read messages that may not have changed, wasting battery power. These deficiencies can be remedied by providing a DCCH having new formats and processes, one example of which is described in U.S. patent application Ser. No. 07/956,640 entitled "Digital Control Channel", which was filed on Oct. 5, 1992, and which is incorporated in this application by reference. Using such DCCHs, each IS-54B radio channel can carry DTCs only, DCCHs only, or a mixture of both DTCs and DCCHs. Within the IS-54B framework, each radio carrier frequency can have up to three full-rate DTCs/DCCHs, or six half-rate DTCs/DCCHs, or any combination in-between, for example, one full-rate and four half-rate DTCs/DCCHs. As described in this application, a DCCH in accordance with Applicants' invention provides a further increase in functionality.

In general, however, the transmission rate of the DCCH need not coincide with the half-rate and full-rate specified in IS-54B, and the length of the DCCH slots may not be uniform and may not coincide with the length of the DTC slots. The DCCH may be defined on an IS-54B radio channel and may consist, for example, of every n-th slot in the stream of consecutive TDMA slots. In this case, the length of each DCCH slot may or may not be equal to 6.67 msec, which is the length of a DTC slot according to IS-54B. Alternatively (and without limitation on other possible alternatives), these DCCH slots may be defined in other ways known to one skilled in the art.

As such hybrid analog/digital systems mature, the number of analog users should diminish and the number of digital users should increase until all of the analog voice and control channels are replaced by digital traffic and control channels. When that occurs, the current dual-mode mobile terminals can be replaced by less expensive digital-only mobile units, which would be unable to scan the ACCs currently provided in the IS-54B system. One conventional radiocommunication system used in Europe, known as GSM, is already an all-digital system, in which 200-KHz-wide radio channels are located near 900 MHz. Each GSM radio channel has a gross data rate of 270 kilobits per second and is divided into eight full-rate traffic channels (each traffic time slot carrying 116 encrypted bits).

In cellular telephone systems, an air-interface communications link protocol is required in order to allow a mobile station to communicate with the base stations and MSC. The communications link protocol is used to initiate and to receive cellular telephone calls. As described in U.S. patent application Ser. No. 08/047,452 entitled "Layer 2 Protocol for the Random Access Channel and the Access Response Channel," which was filed on Apr. 19, 1993, and which is incorporated in this application by reference, the communications link protocol is commonly referred to within the communications industry as a Layer 2 protocol, and its functionality includes the delimiting, or framing, of Layer 3 messages. These Layer 3 messages may be sent between communicating Layer 3 peer entities residing within mobile stations and cellular switching systems. The physical layer (Layer 1) defines the parameters of the physical communications channel, e.g., radio frequency spacing, modulation characteristics, etc. Layer 2 defines the techniques necessary for the accurate transmission of information within the constraints of the physical channel, e.g., error correction and detection, etc. Layer 3 defines the procedures for reception and processing of information transmitted over the physical channel.

Communications between mobile stations and the cellular switching system (the base stations and the MSC) can be described in general with reference to FIGS. 1 and 2. FIG. 1 schematically illustrates pluralities of Layer 3 messages 11, Layer 2 frames 13, and Layer 1 channel bursts, or time slots, 15. In FIG. 1, each group of channel bursts corresponding to each Layer 3 message may constitute a logical channel, and as described above, the channel bursts for a given Layer 3 message would usually not be consecutive slots on an IS-54B carrier. On the other hand, the channel bursts could be consecutive; as soon as one time slot ends, the next time slot could begin.

Each Layer 1 channel burst 15 contains a complete Layer 2 frame as well as other information such as, for example, error correction information and other overhead information used for Layer 1 operation. Each Layer 2 frame contains at least a portion of a Layer 3 message as well as overhead information used for Layer 2 operation. Although not indicated in FIG. 1, each Layer 3 message would include various information elements that can be considered the payload of the message, a header portion for identifying the respective message's type, and possibly padding.

Each Layer 1 burst and each Layer 2 frame is divided into a plurality of different fields. In particular, a limited-length DATA field in each Layer 2 frame contains the Layer 3 message 11. Since Layer 3 messages have variable lengths depending upon the amount of information contained in the Layer 3 message, a plurality of Layer 2 frames may be needed for transmission of a single Layer 3 message. As a result, a plurality of Layer 1 channel bursts may also be needed to transmit the entire Layer 3 message as there is a one-to-one correspondence between channel bursts and Layer 2 frames.

As noted above, when more than one channel burst is required to send a Layer 3 message, the several bursts are not usually consecutive bursts on the radio channel. Moreover, the several bursts are not even usually successive bursts devoted to the particular logical channel used for carrying the Layer 3 message. Since time is required to receive, process, and react to each received burst, the bursts required for transmission of a Layer 3 message are usually sent in a staggered format, as schematically illustrated in FIG. 2 and as described above in connection with the IS-54B standard.

FIG. 2 shows a general example of a forward (or downlink) DCCH configured as a succession of time slots 1, 2, ..., N, ... included in the consecutive time slots 1, 2, ... sent on a carrier frequency. These DCCH slots may be defined on a radio channel such as that specified by IS-54B, and may consist, as seen in FIG. 2 for example, of every n-th slot in a series of consecutive slots. Each DCCH slot has a duration that may or may not be 6.67 msec, which is the length of a DTC slot according to the IS-54B standard.

As shown in FIG. 2, the DCCH slots may be organized into superframes (SF), and each superframe includes a number of logical channels that carry different kinds of information. One or more DCCH slots may be allocated to each logical channel in the superframe. The exemplary downlink superframe in FIG. 2 includes three logical channels: a broadcast control channel (BCCH) including six successive slots for overhead messages; a paging channel (PCH) including one slot for paging messages; and an access response channel (ARCH) including one slot for channel assignment and other messages. The remaining time slots in the exemplary superframe of FIG. 2 may be dedicated to other logical channels, such as additional paging channels PCH or other channels. Since the number of mobile stations is usually much greater than the number of slots in the superframe, each paging slot is used for paging several mobile stations that share some unique characteristic, e.g., the last digit of the MIN.

For purposes of efficient sleep mode operation and fast cell selection, the BCCH may be divided into a number of sub-channels. U.S. patent application Ser. No. 07/956,640 discloses a BCCH structure that allows the mobile station to read a minimum amount of information when it is switched on (when it locks onto a DCCH) before being able to access the system (place or receive a call). After being switched on, an idle mobile station needs to regularly monitor only its assigned PCH slots (usually one in each superframe); the mobile can sleep during other slots. The ratio of the mobile's time spent reading paging messages and its time spent asleep is controllable and represents a tradeoff between call-set-up delay and power consumption.

Since each TDMA time slot has a certain fixed information carrying capacity, each burst typically carries only a portion of a Layer 3 message as noted above. In the uplink direction, multiple mobile stations attempt to communicate with the system on a contention basis, while multiple mobile stations listen for Layer 3 messages sent from the system in the downlink direction. In known systems, any given Layer 3 message must be carried using as many TDMA channel bursts as required to send the entire Layer 3 message.

Digital control and traffic channels are desirable for these and other reasons described in U.S. patent application Ser. No. 08/147,254, entitled "A Method for Communicating in a Wireless Communication System", which was filed on Nov. 1, 1993, and which is incorporated in this application by reference. For example, they support longer sleep periods for the mobile units, which results in longer battery life. Although IS-54B provides for digital traffic channels, more flexibility is desirable in using digital control channels having expanded functionality to optimize system capacity and to support hierarchical cell structures, i.e., structures of macrocells, microcells, picocells, etc. The term "macrocell" generally refers to a cell having a size comparable to the sizes of cells in a conventional cellular telephone system (e.g., a radius of at least about 1 kilometer), and the terms "microcell" and "picocell" generally refer to progressively smaller cells. For example, a microcell might cover a public indoor or outdoor area, e.g., a convention center or a busy street, and a picocell might cover an office corridor or a floor of a high-rise building. From a radio coverage perspective, macrocells, microcells, and picocells may be distinct from one another or may overlap one another to handle different traffic patterns or radio environments.

FIG. 3 is an exemplary hierarchical, or multi-layered, cellular system. An umbrella macrocell 10 represented by a hexagonal shape makes up an overlying cellular structure. Each umbrella cell may contain an underlying microcell structure. The umbrella cell 10 includes microcell 20 represented by the area enclosed within the dotted line and microcell 30 represented by the area enclosed within the dashed line corresponding to areas alone city streets, and picocells 40, 50, and 60, which cover individual floors of a building. The intersection of the two city streets covered by the microcells 20 and 30 may be an area of dense traffic concentration, and thus might represent a hot spot.

FIG. 4 represents a block diagram of an exemplary cellular mobile radiotelephone system, including an exemplary base station 110 and mobile station 120. The base station includes a control and processing unit 130 which is connected to the MSC 140 which in turn is connected to the PSTN (not shown). General aspects of such cellular radiotelephone systems are known in the art, as described by the above-cited U.S. patent applications and by U.S. Pat. No. 5,175,867 to Wejke et al., entitled "Neighbor-Assisted Handoff in a Cellular Communication System," and U.S. patent application Ser. No. 07/967,027 entitled "Multi-mode Signal Processing," which was filed on Oct. 27, 1992, both of which are incorporated in this application by reference.

The base station 110 handles a plurality of voice channels through a voice channel transceiver 150, which is controlled by the control and processing unit 130. Also, each base station includes a control channel transceiver 160, which may be capable of handling more than one control channel. The control channel transceiver 160 is controlled by the control and processing unit 130. The control channel transceiver 160 broadcasts control information over the control channel of the base station or cell to mobiles locked to that control channel. It will be understood that the transceivers 150 and 160 can be implemented as a single device, like the voice and control transceiver 170, for use with DCCHs and DTCs that share the same radio carrier frequency.

The mobile station 120 receives the information broadcast on a control channel at its voice and control channel transceiver 170. Then, the processing unit 180 evaluates the received control channel information, which includes the characteristics of cells that are candidates for the mobile station to lock on to, and determines on which cell the mobile should lock. Advantageously, the received control channel information not only includes absolute information concerning the cell with which it is associated, but also contains relative information concerning other cells proximate to the cell with which the control channel is associated, as described in U.S. Pat. No. 5,353,332 to Raith et al., entitled "Method and Apparatus for Communication Control in a Radiotelephone System," which is incorporated in this application by reference.

As noted above, one of the goals of a digital cellular system is to increase the user's "talk time", i.e., the battery life of the mobile station. To this end, U.S. patent application Ser. No. 07/956,640 discloses a digital forward control channel (base station to mobile station) that can carry the types of messages specified for current analog forward control channels (FOCCs), but in a format which allows an idle mobile station to read overhead messages when locking onto the FOCC and thereafter only when the information has changed; the mobile sleeps at all other times. In such a system, some types of messages are broadcast by the base stations more frequently than other types, and mobile stations need not read every message broadcast.

Also, application Ser. No. 07/956,640 shows how a DCCH may be defined alongside the DTCs specified in IS-54B. For example, a half-rate DCCH could occupy one slot and a full-rate DCCH could occupy two slots out of the six slots in each TDMA frame. For additional DCCH capacity, additional half-rate or full-rate DCCHs could replace DTCs. In general, the transmission rate of a DCCH need not coincide with the half-rate and full-rate specified in IS-54B, and the length of the DCCH time slots need not be uniform and need not coincide with the length of the DTC time slots.

Although the above-described communication systems are highly beneficial and are markedly different from previous systems, Applicants' communication system is capable of broadcasting special messages to the mobile stations without affecting other aspects of its performance.

SUMMARY

According to an exemplary embodiment of the present invention, broadcast SMS systems can be provided wherein a plurality of messages are transmitted over one or more sub-channels of a logical S-BCCH channel that have a fixed, time multiplexed format relative to other logical channels. Message attributes are specified on a per message basis so that a mobile station will look at the attributes of each message to determine whether or not that message should be read by that mobile station. In this exemplary embodiment, new sub-channels are added by the system as needed to support the number of messages to be transmitted at any given time.

According to another exemplary embodiment of the present invention, broadcast SMS systems can be provided wherein the sub-channel ordering is more flexible since it is not provided in a fixed, time multiplexed format. Message attributes are associated on a sub-channel basis rather than a per message basis. In this way, messages can be grouped into categories based upon subsets of different message attributes and transmitted based upon their grouping. Similarly, mobile messages associated with those groups whose attribute(s) match those associated with a subscriber.

BRIEF DESCCRIPTION OF THE DRAWINGS

The features and advantages of Applicants' invention will be understood by reading this description in conjunction with the drawings, in which:

FIG. 5 shows a hyperframe structure;

FIG. 6 shows the logical channels of the DCCH;

FIG. 7 shows an exemplary TDMA frame structure;

FIG. 9 shows the partitioning of data before channel encoding;

FIG. 10 shows a paging frame structure;

FIG. 11 shows an SMS frame structure;

FIG. 12 shows an example of SMS sub-channel multiplexing; and

FIGS. 13a–13c show S-BCCH Layer 2 frames according to a first exemplary broadcast SMS embodiment; and FIGS. 14a–14d show S-BCCH Layer 2 frames according to a second exemplary embodiment.

DETAILED DESCRIPTION

Figure 1:
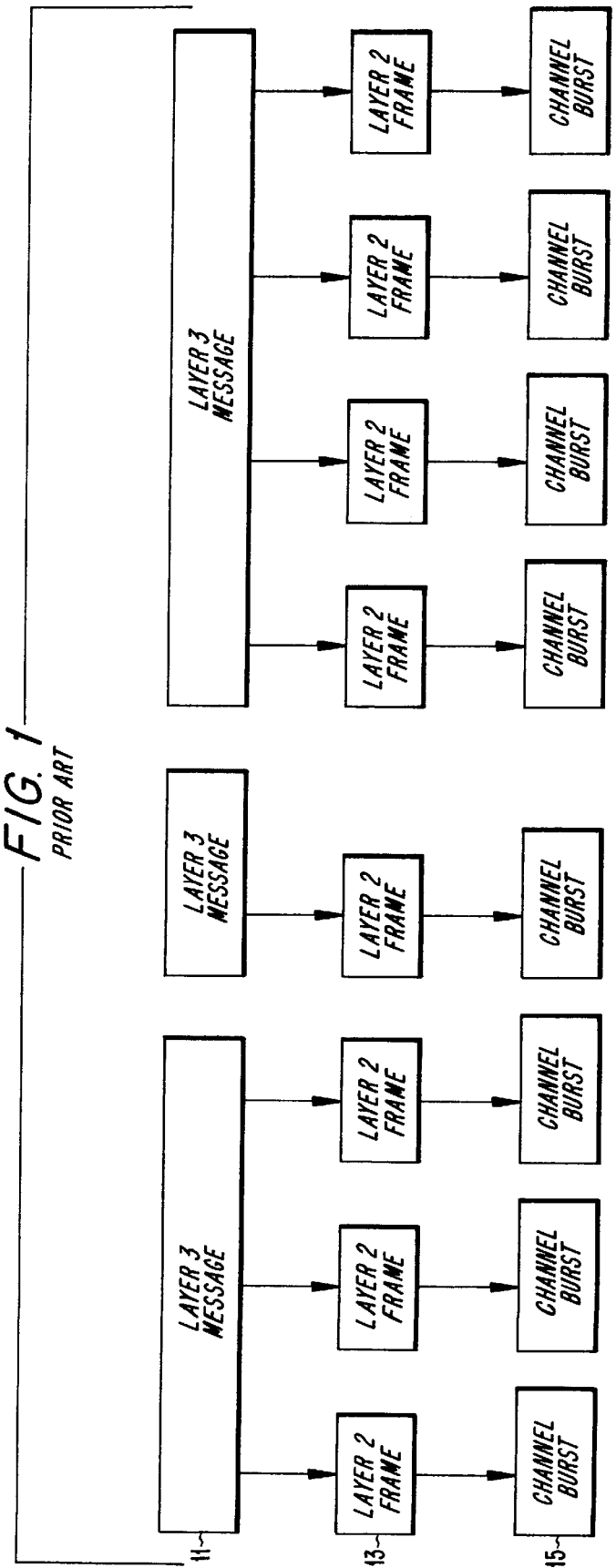
FIG. 1 illustrates a plurality of Layer 3 messages, Layer 2 frames, and Layer 1 channel bursts in a communication system.
Figure 2:
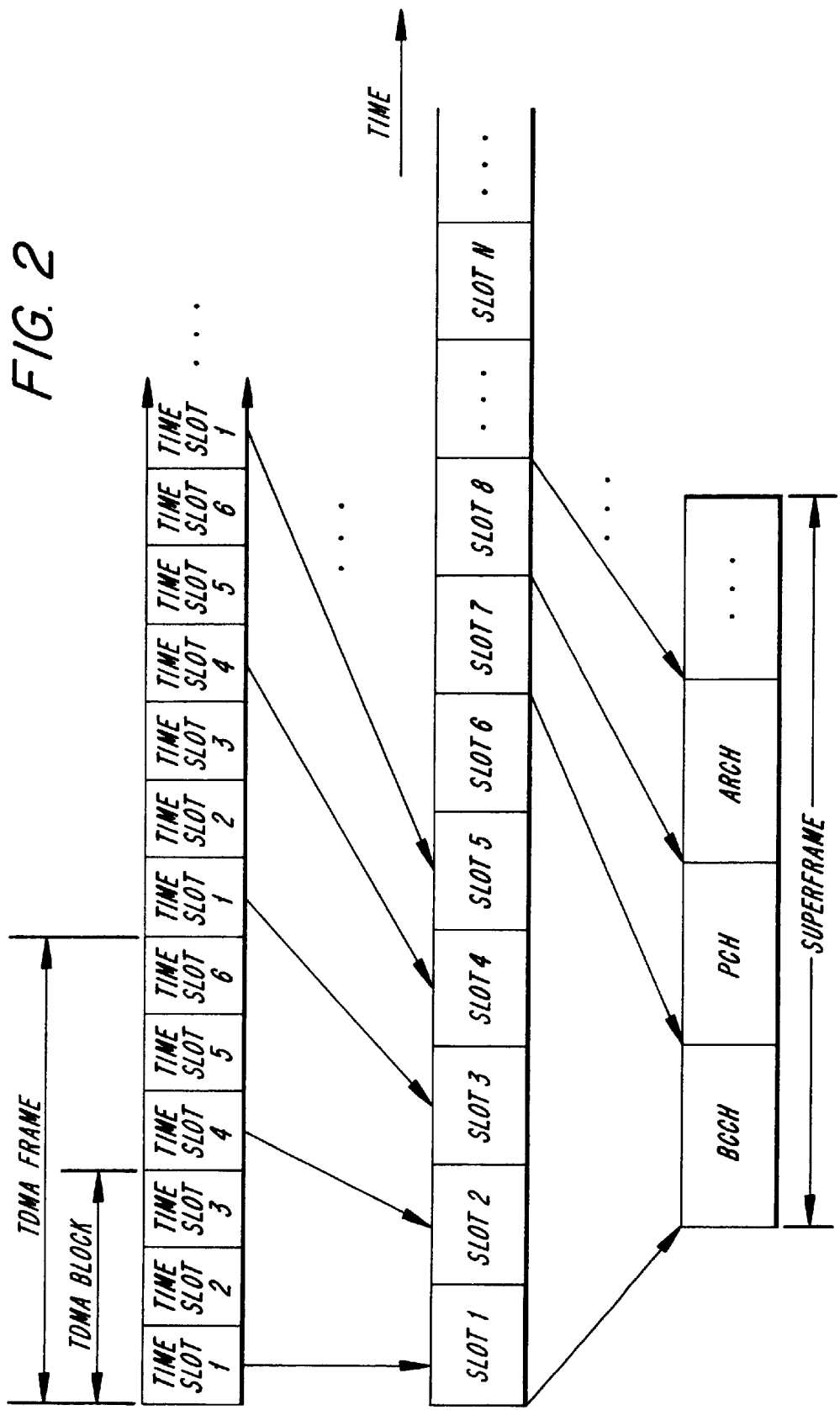
FIG. 2 is a generalized view of a digital control channel (DCCH) having time slots which are grouped into superframes.
Figure 3:
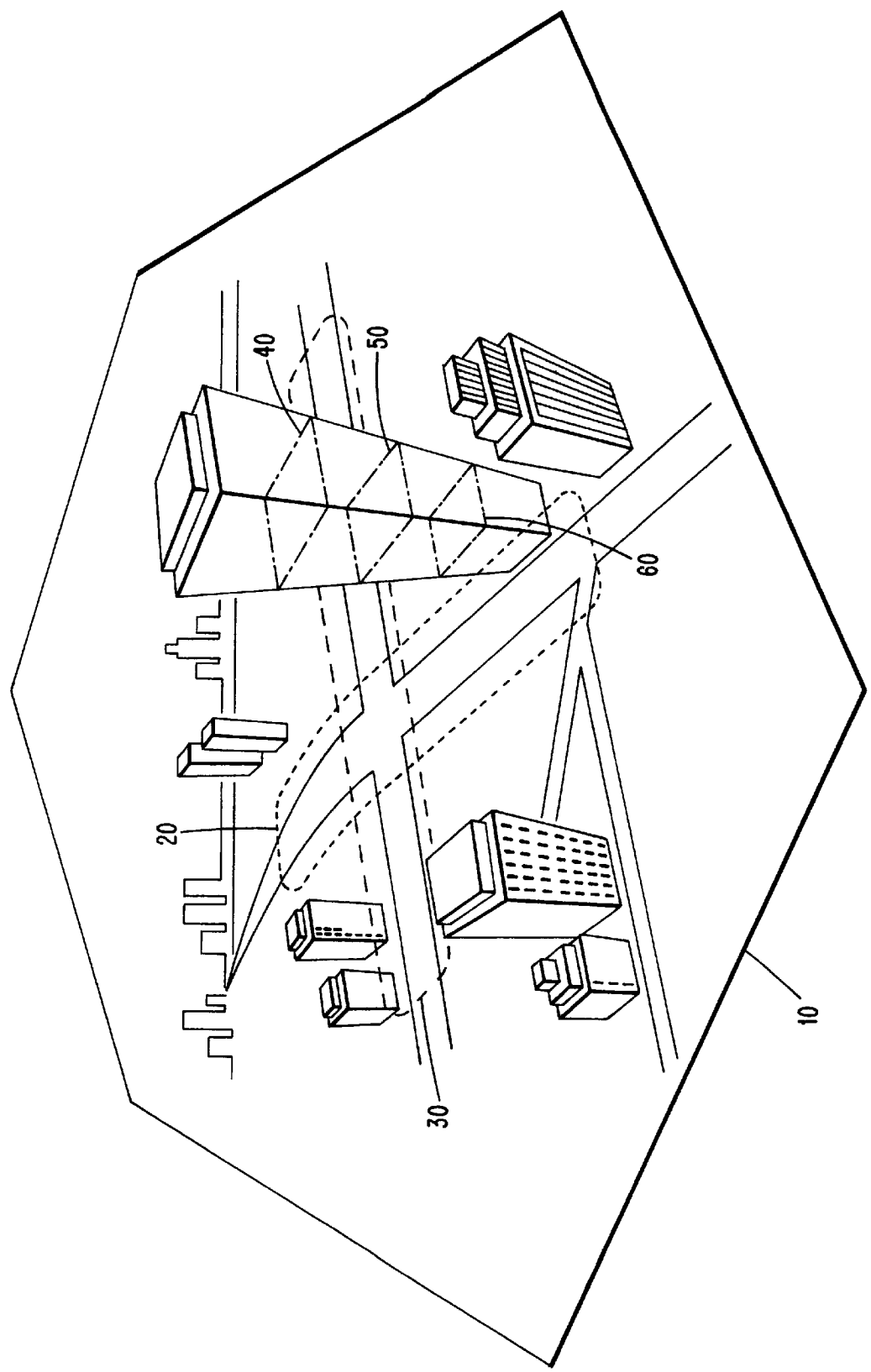
FIG. 3 illustrates a typical multi-layered cellular system employing umbrella macrocells, microcells and picocells.
Figure 4:
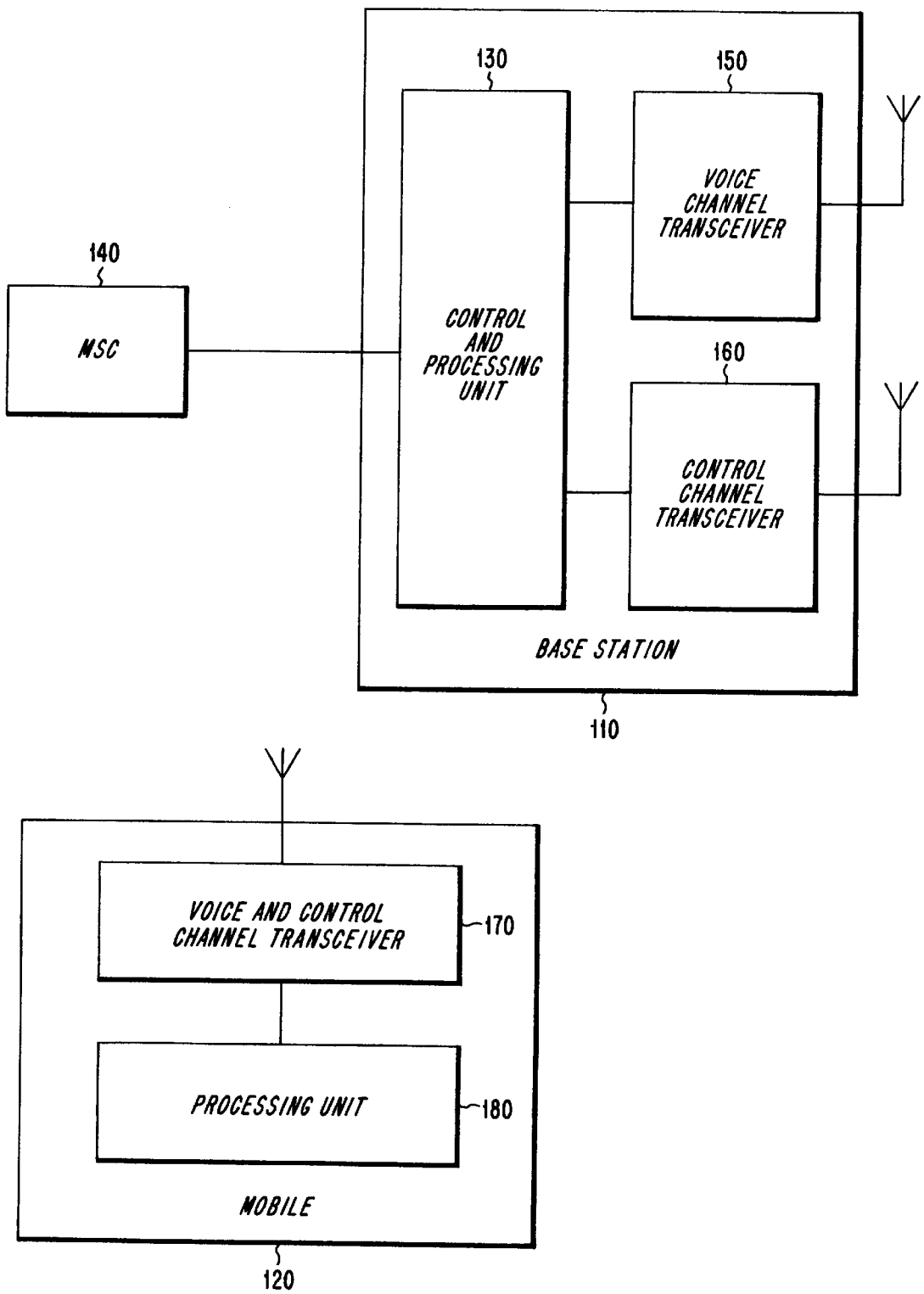
FIG. 4 represents an exemplary implementation of an apparatus for a radiotelephone system according to the present invention.

The following description is in terms of a cellular radiotelephone system, but it will be understood that Applicants' invention is not limited to that environment. Also, the following description is in the context of TDMA cellular communication systems, but it will be understood by those skilled in the art that the present invention may apply to other digital communication applications such as Code Division Multiple Access (CDMA). The physical channel may be, for example, a relatively narrow band of radio frequencies (FDMA), a time slot on a radio frequency (TDMA), a code sequence (CDMA), or a combination of the foregoing, which can carry speech and/or data, and is not limited to any particular mode of operation, access technique, or system architecture.

In one aspect of Applicants' invention, communication between mobile stations and base stations is structured into successions of different kinds of logical frames. FIG. 5 illustrates the frame structure of a forward (base station to mobile station) DCCH and shows two successive hyperframes (HF), each of which preferably comprises a respective primary superframe (SF) and a respective secondary superframe. It will be recognized, of course, that a hyperframe could include more than two superframes.

Three successive superframes are illustrated in FIG. 5, each comprising a plurality of time slots that are organized as logical channels F-BCCH, E-BCCH, S-BCCH, and SPACH that are described in more detail below. At this point, it is sufficient to note that each superframe in a forward DCCH includes a complete set of F-BCCH information (i.e., a set of Layer 3 messages), using as many slots as are necessary, and that each superframe begins with a F-BCCH slot. After the F-BCCH slot or slots, the remaining slots in each superframe include one or more (or no) slots for the E-BCCH, S-BCCH, and SPACH logical channels.

Referring to FIG. 5, and more particularly to FIG. 6, each superframe of the downlink (forward) DCCH preferably comprises a broadcast control channel BCCH, and a short-message-service/paging/access channel SPACH. The BCCH comprises a fast BCCH (the F-BCCH shown in FIG. 5); an extended BCCH (the E-BCCH); and a short-message-service BCCH (the S-BCCH), all of which are used, in general, to carry generic, system-related information from the base stations to the mobiles. The BCCH is unidirectional, shared, point-to-multipoint, and unacknowledged. The SPACH comprises a short-message-service channel SMSCH, a plurality of paging channels PCH, and an access response channel ARCH, which are used to send information to specific mobile stations relating to short-message-service point-to-point messages (S MSCH), paging messages (PCH), and messages responding to attempted accesses (ARCH) as described below. The SPACH is unidirectional, shared, and unacknowledged. The PCH may be considered point-to-multipoint, in that it can be used to send paging messages to more than one mobile station, but in some circumstances the PCH is point-to-point. The ARCH and SMSCH are generally point-to-point, although messages sent on the ARCH can also be addressed to more than one mobile station.

For communication from the mobile stations to the base stations, the reverse (uplink) DCCH comprises a random access channel RACH, which is used by the mobiles to request access to the system. The RACH logical channel is unidirectional, shared, point-to-point, and acknowledged. All time slots on the uplink are used for mobile access requests, either on a contention basis or on a reserved basis. Reserved-basis access is described in U.S. patent application Ser. No. 08/140,467, entitled "Method of Effecting Random Access in a Mobile Radio System", which was filed on Oct. 25, 1993, and which is incorporated in this application by reference. One important feature of RACH operation is that reception of some downlink information is required, whereby mobile stations receive real-time feedback for every burst they send on the uplink. This is known as Layer 2 ARQ, or automatic repeat request, on the RACH. The downlink information preferably comprises twenty-two bits that may be thought of as another downlink sub-channel dedicated to carrying, in the downlink, Layer 2 information specific to the uplink. This flow of information, which can be called shared channel feedback, enhances the throughput capacity of the RACH so that a mobile station can quickly determine whether any burst of any access attempt has been successfully received. Other aspects of the RACH are described below.

The F-BCCH logical channel carries time-critical system information, such as the structure of the DCCH, other parameters that are essential for accessing the system, and an E-BCCH change flag that is described in more detail below; as noted above, a complete set of F-BCCH information is sent in every superframe. The E-BCCH logical channel carries system information that is less time-critical than the information sent on the F-BCCH; a complete set of E-BCCH information (i.e., a set of Layer 3 messages) may span several superframes and need not be aligned to start in the first E-BCCH slot of a superframe. The S-BCCH logical channel carries short broadcast messages, such as advertisements and information of interest to various classes of mobile subscriber, and possibly system operation information, such as change flags for the other logical channels. An important aspect of Applicants' invention is that the S-BCCH decouples the system overhead information sent on the F-BCCH and E-BCCH from the broadcast message service (S-BCCH), obtaining maximum system flexibility. It would be possible to omit the S-BCCH and send its messages on the E-BCCH or even the F-BCCH, but doing so would delay the delivery of important system information since the SMS messages would be intermingled with the system overhead messages.

As for the SPACH slots, they are assigned dynamically to the SMSCH, PCH, and ARCH channels based on transmitted header information. The SMSCH logical channel is used to deliver short messages to a specific mobile station receiving SMS services. The PCH logical channel carries paging messages and other orders to the mobiles, such as the F-BCCH change flag described above and in U.S. patent application Ser. No. 07/956,640. Mobile stations are assigned respective PCH slots in a manner described in more detail below. A mobile station listens to system responses sent on the ARCH logical channel upon successful completion of the mobile's access on a RACH. The ARCH may be used to convey AVC or DTC assignments or other responses to the mobile's attempted access.

An important aspect of exemplary embodiments is that every PCH slot in the primary superframe of a hyperframe is repeated in the secondary superframe of that hyperframe. This is called "specification guaranteed repeat". Thus, once a mobile station has read the BCCH information, it can enter sleep mode after determining, based on its MIN or some other distinguishing characteristic, which single PCH slot it is to monitor for a paging message. Then, if the mobile station properly receives a paging message sent in its PCH slot in a primary superframe, the mobile can sleep through the entire associated secondary superframe, thereby increasing the life of its batteries. If and only if the mobile station cannot correctly decode its assigned PCH slot in a primary superframe, the mobile reads the corresponding PCH slot in the associated secondary superframe.

It should be understood, however, that the mobile station may read its PCH slot in only one of the superframes, either primary or secondary, for a variety of reasons, whether or not the slot is correctly decoded. This may be permitted to maximize the mobile's sleep time. Also, after the mobile has read its PCH slot in one of the superframes (for example, a primary superframe), the mobile may monitor other control channels during at least part of the time until the next (primary) superframe without missing a page on the first control channel. Indeed, the mobile may even read a paging slot on another control channel. This enables cell reselection to be carried out smoothly and avoids the mobile's being blind to pages during such reselection. It will be recognized that reselection is facilitated when the two control channels are synchronized, at least to the extent that a time offset between their superframes is known, which is information that may be provided on the E-BCCH for example.

One aspect of a DCCH as described in U.S. patent application Ser. No. 07/956,640 is that the F-BCCH slots in successive superframes carry the same information until change flags transmitted in the PCH slots toggle, or otherwise change value in a predetermined way. This feature is also provided in the systems and methods described in this application. Also, the E-BCCH and S-BCCH information may span both superframes in a hyperframe, and even several hyperframes, which represents a tradeoff between BCCH bandwidth (i.e., the number of slots needed for sending a complete set of BCCH messages) and the time required for a full cycle of messages sent. The toggling of a change flag in the PCH slot indicates that new data will be found on the F-BCCH sent in the following superfarne. In this way, once a mobile station has read the BCCH information on a DCCH, the mobile need awaken only to read its assigned PCH slot; when the change flag in its PCH slot toggles, the mobile learns that it must either awaken or stay awake to re-acquire the F-BCCH, which has changed; if the mobile determines that the change flag has not toggled, it is not necessary for the mobile to read the F-BCCH. This also increases the mobile's sleep time, and battery life.

In a similar way, the F-BCCH slots may include E-BCCH change flags indicating that the system has changed the E-BCCH information. In response to an E-BCCH change flag, the mobile would stay awake to read the E-BCCH slots. It will be understood that the change of the E-BCCH change flag in the F-BCCH slots is "new data" to be found on the F-BCCH that would be indicated by the F-BCCH change flag transmitted in the PCH slots. The mobile station preferably stores the value of the E-BCCH change flag transmitted in the F-BCCH slots before reading the E-BCCH. After the mobile station has acquired the relevant information (which may be dependent on the specific task the mobile is engaged in), the mobile reads the E-BCCH change notification flag again. The process of updating/initiating the E-BCCH message set can be considered successful when the E-BCCH change flag is the same before and after the mobile reads the E-BCCH.

Among the other important features of Applicants' invention, is that information is not interleaved among successive slots, although as described below, information may be interleaved among fields in the same slot. Also as described below, the downlink information is advantageously encoded by error correction codes for immunity to channel impairments, for example a convolutional rate-½ code. It is desirable not to use "too much" encoding like a convolutional rate-¼ code, however, because the number of user data bits sent in any given channel burst would be low. Also, such encoding is not needed because the BCCH information is repeated in every superframe and certain transactions can use ARQ. The BCCH and PCH cannot use ARQ, of course, but using a single type of coding is advantageous because it reduces equipment complexity. Therefore, to obtain sufficient protection, somewhat less encoding is combined with the time diversity provided by specification guaranteed repeat for the PCH. This combination is also beneficial for sleep mode performance.

The combination of these features results in a communication system that has good immunity to errors at the same time that it permits, on average, long mobile sleep times. It will be appreciated that the guaranteed repeats of the PCH slots provide time diversity, yielding an improved immunity to errors due to Rayleigh fading that is provided in previous systems by rate-¼ encoding and inter-burst interleaving. (Of course, specification guaranteed repeat is not an option for speech slots.) Applicants' combination of these features, however, results in a communication system that permits a mobile that has successfully decoded its PCH slot in a primary superframe to sleep through all of the PCH slots in the corresponding secondary superframe. It will be recognized that the a mobile's assigned PCH slots are temporally separated by many times the duration of such a slot (6.67 msec).

The BCCH information sent in one or more slots of the DCCH comprises information about the serving system and the desired behavior of the mobile station when operating in this system. The overhead information would include, for example, indications of the following: (1) the paging slot to which the mobile station is assigned; (2) whether the mobile station is allowed to make and receive any calls through this base station or is restricted to only emergency calls; (3) the power level to be used for transmitting to this base station; (4) the identity of the system (home system or visited system); (5) whether or not to use an equalizer for compensating distortion and attenuation effects of the radio channel on the transmitted signal; and (6) the location of other DCCHs (frequencies, time slots, time offsets of other DCCHs' superframes with respect to superframes of current DCCH) of neighboring base stations. A DCCH of a neighboring base station may be selected because the DCCH signal received from this base station is too weak or for some other reason, e.g., the signal from another base station is stronger than the signal from this base station.

When a mobile station locks onto the DCCH, the mobile station first reads the overhead information to determine the system identity, call restrictions, etc.; the locations of the DCCHs of the neighboring base stations (the frequencies, time slots, etc., on which these DCCHs may be found); and its paging slot in the superframe (the DCCH slot assigned to the paging frame class to which the mobile station belongs). The relevant DCCH frequencies are stored in memory, and the mobile station then enters sleep mode. Thereafter, the mobile station "awakens" once every hyperframe, depending on the mobile's paging frame class, to read the assigned paging slot, and then returns to sleep.

The F-BCCH information transmitted in every superframe allows a mobile station to read other information in the superframe, to access the system, or to quickly find the best serving cell, when first locking onto a DCCH. For example, certain basic information about the low-layer structure of the DCCH must be read by a mobile station before any other information in the superframe can be read. This basic information includes, for example, a superframe period (number of DCCH slots), whether the DCCH is half-rate or full-rate, the DCCH format (which slot(s) in a TDMA frame), the location of other BCCH channels, the location of the assigned PCH, and whether the mobile station receiver should use an equalizer. Other types of information should also be sent rather often so that a mobile station can quickly accept or reject a particular DCCH. For example, information about the availability and data capability of a cell (the cell may be available only to a closed user group or may not be capable of handling data transmissions from a mobile station), the identity of the system and the cell, etc., may be sent in every superframe. For accelerating system accesses, it would be sufficient for a mobile station to read only system access rules sent on the F-BCCH.

The E-BCCH is assigned a systemcontrolled, fixed number of slots in each superframe, but a long cycle, or set of messages, sent on the E-BCCH may span several superframes; hence, the number E-BCCH slots in each superframe can be much less than the number of slots needed to carry the long cycle, or set of messages. If there are not enough E-BCCH slots in a superframe to accommodate all E-BCCH messages, subsequent superframes are used. Mobile stations are notified through the F-BCCH as described above of the number and location of E-BCCH slots assigned in each superframe. A start-of-E-BCCH marker may be sent in the current F-BCCH (or S-BCCH) to inform the mobile stations that the current superframe contains the start of an E-BCCH message.

With the E-BCCH, long and/or sporadic information may be sent on the DCCH without affecting the organization of the superframe, e.g., PCH assignments, or the DCCH capacity. For example, the list of DCCHs of neighboring base stations may be sent on the E-BCCH. Such a list can be rather large, including the locations of, say, ten other DCCHs. Such a list would require several slots to transmit, and these slots may be spread out over the E-BCCH of several superframes instead of taking up a large portion of one superframe. In this way, BCCH overhead is traded off for a larger number of paging slots (and consequent increased paging capacity).

Layer 1 FORMAT

An exemplary organization of the information transmitted on each radio channel, i.e., the channel bursts, or time slots, in accordance with Applicants' invention is shown in FIG. 7. This organization is similar to that specified by the IS-54B standard. The consecutive time slots on a radio channel are organized in TDMA frames of six slots each and TDMA blocks of three slots each so that a plurality of distinct channels can be supported by a single radio carrier frequency. Each TDMA frame has a duration of 40 msec and supports six halfrate logical channels, three full-rate logical channels, or various combinations between these extremes by interchanging one full-rate channel and two half-rate channels as indicated in the following table. Each slot has a duration of 6.67 msec and carries 324 bits (162 symbols), which have positions in each slot that are conventionally consecutively numbered 1–324.

| Number of Slots | Used Slots | Rate |
|---|---|---|
| 1 | 1 | half |
| 2 | 1, 4 | full |
| 4 | 1, 4, 2, 5 | 2 full |
| 6 | 1, 4, 2, 5, 3, 6 | 3 full |

As explained above, each superframe comprises a predetermined number of successive time slots (full-rate) of a DCCH. Since a complete set of F-BCCH information is sent in each supeframe and since the first slot of each superframe is a F-BCCH slot, each superframe is the interval between such initial F-BCCH slots. It is currently preferred that each superframe consist of thirty-two such time slots, which are distributed among the logical channels F-BCCH, E-BCCH, S-BCCH, and SPACH as illustrated in FIG. 5 for example. Thus, the duration of each logical superframe is simply 32 TDMA blocks/superframe * 20 msec/TDMA block=640 msec, which spans 96 consecutive physical time slots on the radio channel.

It will be appreciated that this selection represents a balance of several factors that Applicants' currently deem most useful. For example, using thirty-two slots, which is an integer power of two, simplifies the implementation of various counters in existing hardware that is based on binary signal processing. Also, using thirty-two-slot superframes balances call set-up delay against paging channel (and other channel) capacity. For a given amount of BCCH information to be transmitted, using longer superframes would increase paging capacity, but would also increase the average set-up delay; using shorter superframes would decrease the average set-up delay to an extent, but would also decrease paging capacity and devote a greater proportion of each superframe to overhead information. Different balances can be struck that would nevertheless fall within the spirit of Applicants' invention.

In order to locate each time slot in each superframe and thus provide the enhanced sleep capabilities made available by Applicants' invention, a superframe phase (SFP) count, which increments by one for each full-rate DCCH slot in a given superframe, is included as part of the information broadcast in each downlink DCCH slot. The SFP value sent in the first slot (an F-BCCH slot) of each superframe may be assigned the value 0; the next slot of the same logical DCCH is assigned an SFP value of 1, etc. Thus, for a system using superframes of thirty-two slots each, the SFP value increments modulo-32, and the SFP value sent in each slot requires five bits. For a half-rate DCCH, only half of the values (e.g., 0, 2, 4, . . . , 30) need be used to identify the slots in each superframe of the DCCH.

It will be appreciated that such a modulo-32 up-counter could be replaced by a modulo-32 down-counter, and for a communication system that does not employ superframes having a fixed number of time slots, the modulo-32 up-counter would be replaced by a down counter for indicating the next occurrence of the F-BCCH, or other desired overhead information. It is only necessary for the information in a slot to include some indication of that slot's position in time with respect to the next occurring time slot carrying the important overhead information. It is also desirable that the information indicate the start of the superframe/hyperframe/paging-frame structures, i.e., that the boundaries of the frame structures all be synchronized with the next occurring time slot carrying the important overhead information, but such synchronization is not necessary.

Figure 8A:
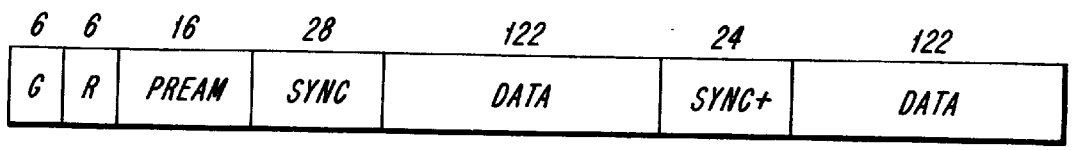
FIGS. 8a–8c show exemplary slot formats on the DCCH.
Figure 8B:
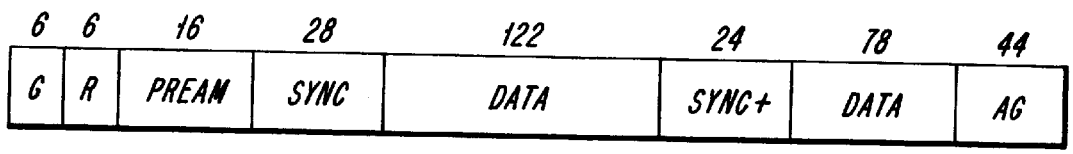
Figure 8C:
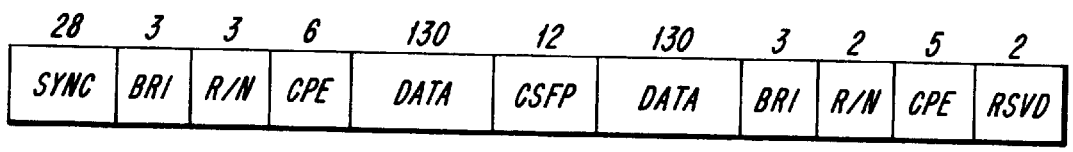

Two possible formats for the information sent in the slots of the reverse DCCH are shown in FIGS. 8a and 8b, and a preferred information format in the slots of the forward DCCH is shown in FIG. 8c. These formats are substantially the same as the formats used for the DTCs under the IS-54B standard, but new functionalities are accorded to the fields in each slot in accordance with Applicants' invention. In FIGS. 8a–8c, the number of bits in each field is indicated above that field.

In general, messages (Layer 2 user data bits) to be carried by the slots are mapped onto the two DATA fields sent in each slot, and in the downlink slots, encoded SFP values are sent in the CSFP fields that uniquely identify each slot according to each slot's relative position in its superframe. Also in the downlink slots, the BRI, R/N, and CPE fields contain the information used in the random access scheme for Layer 2 ARQ on the RACH; comparable Layer 2 ARQ fields could be included in the uplink slots. In the forward DCCH (FIG. 8c), the DATA fields total 260 bits in length, the CSFP field carries twelve bits, and the BRI, R/N, CPE fields for shared channel feedback total twenty-two bits. In the reverse DCCH, the DATA fields total either a normal 244 bits in length (FIG. 8a) or an abbreviated 200 bits (FIG. 8b).

The bits sent in the G, R, PREAM, SYNC, SYNC+, and AG fields are used in a conventional way to help ensure accurate reception of the CSFP and DATA fields, e.g., for synchronization, guard times, etc. For example, the SYNC field would be the same as that of a DTC according to IS-54B and would carry a predetermined bit pattern used by the base stations to find the start of the slot. Also, the SYNC+ field would include a fixed bit pattern to provide additional synchronization information for the base stations, which would set their receiver gains during the PREAM field so as to avoid signal distortion.

Referring again to FIG. 8c, the CSFP field in each DCCH slot conveys the SFP value that enables the mobile stations to find the start of each superframe. The SFP values are preferably encoded with a (12,8) code, similar to the way the DVCC is encoded according to the IS-54B standard; thus, the CSFP field is preferably twelve bits in length, and the unencoded SFP consists of eight bits. Encoding the SFP values in this way has the advantage of using the hardware and software already present in the mobile phone for handling the DVCC. Also, the four check bits are preferably inverted, enabling a mobile to use the information sent in the CSFP field to discriminate between a DCCH and a DTC since the CSFP of a DCCH and the CDVCC of a DTC have no common codewords. Other ways to discriminate DCCHs from DTCs are described in U.S. patent application Ser. No. 08/147,254. In view of the importance of the SFP to the operation of the system, a mobile station might decode the CSFPs in several slots in order to ensure accuracy since the CSFP in any individual slot is less well protected by encoding and time diversity than the Layer 3 message in the DATA fields.

When each superframe includes thirty-two slots, the three most significant bits in each eight unencoded SFP bits may be set to zero. It will be appreciated that the unused SFP bits could be used for particular purposes, e.g., to handle superframes consisting of more than thirty-two slots each or for Layer 1 power control messages. Also, the three unused SFP bits could be used, either alone or in combination with other unused (reserved) bits transmitted in each slot, for increasing the redundancy or strengthening the error correction coding of the SFP, if determined to be necessary. It will be appreciated that the SFP information could be included in the Layer 2 frame header information, rather than in separate Layer 1 fields as shown.

Also, in a system using thirty-two-slot superframes, it is currently preferred that the sixteen CRC, or check, bits in the Layer 2 frames sent in the BCCH slots are inverted, while the sixteen check bits in the Layer 2 frames sent in the SPACH slots are not inverted. Using the check bits in this way is advantageous in some situations where it is necessary to re-assign a mobile station to another paging slot. For example, if a system has been using twelve slots of a thirty-two-slot superframe for the BCCH and wants to use thirteen slots for the BCCH, mobile stations assigned to the first paging slot after the BCCH slots must be informed that they should monitor another paging slot. The mobiles could obtain this information by decoding one or two bits that would identify the type of slot being decoded, but at a cost of reduced bandwidth. In Applicants' system, the mobile stations will recognize that something has changed when they spot the inverted CRC bits, and in response they will re-read the F-BCCH, including the new DCCH structure message.

A hyperframe count and a primary SF indicator are also preferably included in the information carried by the BCCH slots; in particular as described in more detail below, these information elements are included in the DCCH structure message carried by the F-BCCH. The hyperframe count identifies which hyperframe of a higher-level structure of paging frames and SMS frames is currently being broadcast, as described below in connection with FIG. 10. In accordance with Applicants' invention, four paging frame classes and/or a plurality of broadcast SMS sub-channels may be provided as described below. The primary superframe indicator is a single bit that toggles to indicate whether the current superframe is the primary or the secondary superframe in the current hyperframe; when its value is zero, the current superframe may be the primary, and vice versa. In one embodiment of Applicants' invention, the hyperframe count counts modulo-12.

FIG. 9 shows a currently preferred partitioning of the Layer 2 user data bits before channel encoding. The DATA fields in the logical channels BCCH, SPACH, and RACH (normal and abbreviated) preferably use ½-rate convolutional encoding; thus, the two DATA fields in each forward DCCH slot carry 109 plaintext, or unencoded, BCCH or SPACH bits; and the two DATA fields in each reverse DCCH slot carry either a normal 101 plaintext RACH bits or an abbreviated 79 plaintext RACH bits. Also, the encoded user data bits are preferably interleaved between the two DATA fields in each slot, but they are not interleaved among DATA fields in different slots in order to enable the longer sleep times available from Applicants' invention. Interleaving may be done according to suitable convenient matrices, like those used under the IS-54B standard.

Different DCCHs may be assigned to different radio channel frequencies, and a different number of slots may be allocated to the BCCH on each DCCH. Layer 2/3 information may also be different for each DCCH, but this is not required. In an embodiment in which each DCCH includes its own BCCH, much information is redundant from DCCH to DCCH, resulting in a loss of paging capacity. In another embodiment, DCCHs may be organized in master-slave relationships, in which full BCCH information would be available only on the master DCCH; a mobile monitoring a slave DCCH would acquire its BCCH information by changing to its slave's corresponding master DCCH. It is currently preferred that each frequency carry a full set of BCCH information and a mobile station always acquire all its BCCH information on the same frequency as its assigned PCH channel.

The structure of the DCCH transmitted on the F-BCCH in the first slot of each superframe is the most important information for a mobile to acquire. An advantageous DCCH structure message comprises the information elements listed in the following table.

| Information Element | I E Type | Bit Length |
|---|---|---|
| Message type | M | 8 |
| Number of F-BCCH slots | M | 2 |
| Number of E-BCCH slots | M | 3 |
| Number of S-BCCH slots | M | 4 |
| Number of Skipped slots | M | 3 |
| E-BCCH change notification flag | M | 1 |
| Hyperframe count | M | 4 |
| Primary superframe indicator | M | 1 |
| Number of DCCH slots on this frequency | M | 2 |
| MAX_SUPPORTED_PFC | M | 2 |
| PCH_DISPLACEMENT | M | 3 |
| Additional DCCH frequencies | O | 23–114 |
| | Total = | 33–147 |

M = Mandatory
O = Optional

As described above, the mobile station normally monitors only one of the PCH slots in a superframe to minimize power consumption, or battery drain. Since some paging messages may be longer than the capacity of a single time slot, each PCH slot carries a PCON bit that may be set to cause the assigned mobile station to read additional SPACH slots, the number of which is advantageously indicated by a parameter PCH_DISPLACEMENT sent on the F-BCCH. The additional slots to be read preferably are separated by at least 40 msec (one TDMA frame) from the assigned PCH slot for both full- and half-rate DCCHs. For example, for a full-rate DCCH, the mobile station would attempt to read every other SPACH slot up to the number indicated by the PCH_DISPLACEMENT parameter. This is advantageous in that it reduces the trunking loss caused by the creation of the several distinct paging channels. Also, using every other SPACH slot in this way gives a mobile station time for processing its received information to determine whether it must read additional slots. If every SPACH slot were used instead of at least every other one, a mobile station having a slow processing unit might not complete processing by the time the next SPACH slot occurred; since the mobile would not yet be aware that the PCON bit was set, it would have to read the next slot even if that were unnecessary and sleep mode performance would suffer.

Also, the transmission of long ARCH or SMSCH messages to a first mobile station may be interrupted to allow for the transmission of messages to a second mobile station. Each interruption of an ARCH or SMSCH message by another SPACH message may be limited to no more than a predetermined number n of time slots, or by Layer 3 timeout for SMSCH or ARCH messages. It will be understood that Layer 3 timeout refers to the common practice of waiting for a response to a Layer 3 message only for a predetermined period. The number of interruptions each mobile station may suffer may also be limited.

Ordinarily, the probability of a successful transmission of a Layer 3 message is inversely related to the length of the message. Since the probability can be quite small for long messages, a simple-minded system would spend much of its time re-transmitting or re-reading entire messages that were not properly received. In Applicants' system, Layer 3 paging and broadcast SMS messages are mapped onto Layer 2 frames, and these are organized in structures called paging frames and SMS frames, respectively. For the BCCH, if a Layer 2 frame is not received properly, it is not necessary to re-read the entire Layer 3 message but only the improperly received Layer 2 frame. The ARCH and RACH can use ARQ.

In accordance with an aspect of Applicants' invention, the superframes and hyperframes on each DCCH are grouped into a succession of paging frames, each of which includes an integer number of hyperframes and is a member of one of a plurality of paging frame classes; hence, the PCH slots have the paging frame structure. In accordance with one aspect of Applicants' invention, the mobile station reads its assigned PCH slot only in the hyperframes of its allocated paging frame class. (As described above, each mobile station is allocated a specific PCH sub-channel within a paging frame based preferably on the mobile's IS-54B MIN identity.) In many cases, mobile stations would be allocated a paging frame class that would cause the mobiles to read their assigned PCH slots in each hyperframe; this minimizes call set-up time and sleep duration. But other paging classes would have the mobiles read PCH slots in more widely separated hyperframes, delaying call set-ups but increasing sleep times to as much as 123 seconds for some types of paging frame structure. Thus, it will be appreciated that PCH slots are included in every superframe but the PCH slot assigned to a given mobile may not be.

Referring to the exemplary table shown in FIG. 10, primary and secondary PCH slots p and s in the primary and secondary superframes, respectively, of each hyperframe may be grouped in one of four PF classes $PF_1$–$PF_4$, which are distinguished by how frequently the PCH slot information is repeated. Class $PF_1$ may be called the "lowest" PF class because PCHs in this class repeat their information with the lowest duration between repeats; in FIG. 10, the PCH slot is repeated in each successive hyperframe (i.e., in every successive superframe). Class $PF_4$ may be called the "highest" PF class because PCHs in this class repeat their information with the highest duration between repeats; in FIG. 10, the PCH slot is repeated only every fourth hyperframe. As described above, the PCH information in a primary superframe is guaranteed to be repeated in the corresponding secondary superframe. In FIG. 10 for paging frame class PF(i), where i=2, 3, 4, only the PCH assignments which are aligned to $HF_0$ are shown for illustration purposes.

In the embodiment illustrated by FIG. 10, there are only four paging frame classes that are linearly related, yielding maximum sleep times of eight superframes, or 5.12 seconds. Longer sleep times can be obtained by providing more classes that are exponentially related. For example, sleep times of 123 seconds are obtained in a system having eight paging frame classes in which the delays double from class to class. It will be understood that long sleep times can result in access delays that are unacceptable for typical telephone use; for example, most callers attempting to reach a mobile would be unwilling to wait 123 seconds after dialing the mobile's number for contact to be established. Nevertheless, such delays may be tolerable in some cases, such as remote polling of equipment like soft-drink dispensers.

In an embodiment using the table illustrated in FIG. 10, the least common multiple of the indices of the four paging frame classes is twelve; this is the reason that the HF counter counts modulo-12, as described above.

Three other terms used in describing the operation of the PF classes are default PF class, assigned PF class, and current PF class. The default PF class is the class assigned to the mobile station when its subscription to the system is entered. If the default PF class happens to be higher than the highest class supported by a DCCH, as defined by the parameter MAX_SUPPORTED_PFC in the DCCH structure message, the mobile would use the PF class defined by MAX_SUPPORTED_PFC. The assigned PF class refers to a PF class assigned to the mobile by the system, for example in the system's response to a registration request by the mobile. The PF class actually used during a communication may be called the current PF class.

According to other exemplary embodiments of the present invention, broadcast short message service (SMS) can be supported by way of logical sub-channeling in a variety of ways. Two examples will be discussed in detail, with other modifications and adaptations described after the detailed examples.

In one exemplary embodiment of Applicants' invention, depicted in FIGS. 11–13, the S-BCCH slots in successive superframes are grouped into a succession of fixed-length SMS frames, each preferably consisting of twenty-four superframes (twelve hyperframes) as shown in FIG. 11. This S-BCCH frame structure enables messages to be sent with highly variable periodicity without sacrificing capacity, and as described below, it avoids requiring the mobile stations to re-read constantly the entire S-BCCH information when only one of the many messages sent has changed. Also, choosing an SMS frame structure that is conveniently related to the paging frame class structure enables counters that are already in use for one purpose (paging) to be re-used for another purpose (SMS broadcast messaging).

The SMS frames are advantageously divided into a plurality of sub-channels, each having its own repetition cycle defined in terms of units of possible SMS frames. For most practical situations, the sub-channel repetition time should not be too long. In a manner similar to the handling of the F-BCCH change flag described above, a mobile station is informed of a change in the contents of particular sub-channels through an SMS transition flag (TF) included in its PCH slot information.

Currently, four SMS sub-channels are preferred for this exemplary embodiment, and the SMS sub-channels are sub-multiplexed on the S-BCCH channel in units of SMS frames, e.g., SMS frame SMS(i), where i=1, . . . , N, as illustrated in FIG. 12. It will be understood that each (Layer 1) time slot carries a respective SMS frame and that a Layer 3 SMS message can span several SMS frames.

An SF number is advantageously derived from the hyperframe count and primary superframe indicator sent on the BCCH as follows:

SF number=2*HF count+primary SF indicator.

The first S-BCCH slot(s) within each SMS frame (superframe 0) would contain a header that describes the structure of the SMS sub-channel. As noted above, the number of superframes within each SMS frame is fixed for this exemplary embodiment, and thus the number of slots assigned to the SMS frame are 0, 24, 48, 72, . . . (full-rate), depending on how many slots per superframe are assigned to S-BCCH. The SMS frame is aligned to start at HF counter equal to zero and in a primary superframe to help the mobile synchronize to the SMS frame structure. In this way, SMS frames are synchronized to the hyperframes and superframes, although it will be appreciated that the start of an SMS frame is offset from the start of a hyperframe (or a primary superframe) since the S-BCCH slots are not the first slots in a superframe. Furthermore, regardless of how many paging frame classes are supported, the system increments the hyperframe count to provide SMS frame synchronization information to the mobile station.

According to Layer 2 information found in every first slot in each SMS frame, the set of messages in an SMS frame SMS(i) may span a number M(i) of SMS frames before a cycle is completed. Regardless of varying message set cycles among the sub-channels, SMS frame SMS(i) is always followed by SMS frame SMS((i+1) mod N+1) in order of transmission in this exemplary embodiment. Thus, Layer 3 broadcast SMS messages can span several SMS frames, which represents a tradeoff between the number of slots in each superframe devoted to SMS broadcast and the time needed for message transmission.

A transition flag (TF) is provided for each SMS sub-channel, and the flags for all SMS sub-channels are sub-multiplexed onto a single flag, transmitted on the SPACH channel, that points to the next logical SMS frame to be read. For example, FIG. 12 shows flag TF(2) pointing to SMS frame SMS(2). If the transition flag for a sub-channel indicates a change, the mobile station reads an S-BCCH header field at the start of the next logical SMS frame to obtain further information, as described more fully below.

Header information describes the sub-channeling of the broadcast SMS channel and is provided in the first slot of every SMS frame. The mobile can also find the Layer 3 structure of the SMS frame associated with this header. A suitable SMS Header information element located at the start of every SMS frame is shown in the table below.

| Information Element | Range (Logical) | Bits |
| --- | --- | --- |
| Number of Sub-channels | 1–4 | 2 |
| Sub-channel Number | 1–4 | 2 |
| Phase Length of Sub-ch. Cycle | 1–64 | 6 |
| Phase Number of Sub-ch. Cycle | 1–64 | 6 |
| Number of SMS Messages (N) | 1–64 (set to 1 plus value in field) | 6 |
| ° SMS Message ID (Note 1) | 0–255 (unique ID in cycle) | 8 |
| ° Layer 2 Frame Start (Note 1) | 0–255 (Layer 2 frame identifier) | 8 |

Note 1: N instances of these two elements are sent consecutively.

SMS data may span several SMS frames, but the flags TF enable interruption of the sub-channel cycles (cycle clearing). For example, after a flag TF, the mobile station assumes that the next sub-channel is the start of the new cycle. There are two ways to change the data provided on the broadcast SMS: changing the Layer 3 messages within the SMS (messages may be added and/or deleted from any position in the cycle), and changing the structure of the sub-channels.

The SMS Message IDs, of which there are a set of 256, and their associated Layer 2 Frame Starts comprise a list of all messages appearing in an SMS frame. SMS Message IDs are unique for each SMS frame and the whole set of 256 values is used before the set begins to be used again in order to aid the mobile in searching for changed message(s) and in avoiding reading messages that have not changed. A Layer 2 Frame Start information element is provided to point to the start of the Layer 2 frame in which the associated SMS message begins (the message does not have to begin at the start of the Layer 2 frame). A description of message delivery is provided in the description of the S-BCCH Layer 2 Protocol given below.

In the example shown in the table below, four messages make up SMS frame 1, and it may be assumed that only one slot in each superframe is dedicated to S-BCCH. (Since it is currently preferred that each SMS frame include twenty-four superframes, there are twenty-four slots in each SMS frame.)

| Previous SMS Frame 1 Header | | New SMS Frame 1 Header | |
| --- | --- | --- | --- |
| Number of sub-channels | 3 | Number of sub-channels | 3 |
| Sub-channel number | 1 | Sub-channel number | 1 |
| Length of sub-ch. cycle | 2 | Length of sub-ch. cycle | 2 |
| Phase of sub-ch. cycle | 1 | Phase of sub-ch. cycle | 1 |
| Number of SMS messages (N) | 4 | Number of SMS messages N) | 5 |
| °1 SMS message ID | 1 | °1 SMS message ID | 1 |
| °1 Layer 2 Frame Start | 1 | °1 Layer 2 Frame Start | 1 |
| °2 SMS message ID | 2 | °2 SMS message ID | 2 |
| °2 Layer 2 Frame Start | 2 | °2 Layer 2 Frame Start | 2 |
| °3 SMS message ID | 3 | °4 SMS message ID | 4 |
| °3 Layer 2 Frame Start | 2 | °4 Layer 2 Frame Start | 2 |
| °4 SMS message ID | 4 | °5 SMS message ID | 5 |
| °4 Layer 2 Frame Start | 3 | °5 Layer 2 Frame Start | 3 |
| | | °6 SMS message ID | 6 |
| | | °6 Layer 2 Frame Start | 3 |

In the table above, the mobile is assumed to be monitoring the SPACH when the TF toggles to indicate a change in the S-BCCH. The mobile knows from its own internal superframe count where the start of the SMS frame is, and it can determine that SMS sub-channel three is currently being broadcast by reading the SMS header and that the TF points to a change in SMS sub-channel one. When SMS sub-channel one begins, the mobile reads the SMS header. It determines that message 3 is removed; that the position of message 4 has changed (but the message ID is the same so the mobile does not need to re-read this message); and that new messages 5 and 6 have been added and must be read. The mobile may skip the appropriate number of Layer 2 frames to read the new messages.

S-BCCH Layer 2 PROTOCOL

The S-BCCH Layer 2 protocol is used when a TDMA burst carries S-BCCH information. Each S-BCCH Layer 2 protocol frame is constructed to fit in a 125-bit envelope. An additional five bits are reserved for use as tail bits, which are the last bits sent to the channel coder, resulting in a total of 130 bits of Layer 2 information carried within each S-BCCH slot. As noted above, the Layer 2 protocol for S-BCCH operation supports only unacknowledged operation. Several different S-BCCH Layer 2 frames which support this exemplary SMS embodiment are shown in FIGS. 13*a*, 13*b*, 13*c*.

FIG. 13*a* shows a mandatory minimum S-BCCH BEGIN frame and FIG. 13*b* shows another S-BCCH BEGIN Frame used when two Layer 3 messages are included in the frame with the second Layer 3 message being continued in a following frame. The BEGIN frames are used for starting the delivery of one or more Layer 3 messages on the S-BCCH, and it is currently preferred that an S-BCCH BEGIN frame be used as the first frame of the S-BCCH cycle. If the first Layer 3 message is shorter than one S-BCCH frame, a begin/end indicator BE is added to the end of the L3DATA field as shown to indicate whether or not an additional Layer 3 message is started within the BEGIN frame. As shown in FIG. 13*a*, if the BE indicator is set to indicate "END", the rest of the BEGIN frame is padded with FILLER, e.g., zeroes. As shown in FIG. 13*b*, if the BE indicator is set to indicate "BEGIN", a new Layer 3 message is started in the BEGIN frame. If the L3DATA field ends on an S-BCCH frame boundary, the BE indicator is not included in the frame; an "END" indication is implied. If the L3DATA field ends with less than nine bits remaining in the S-BCCH frame, the BE indicator is set to "END", and the rest of the frame is padded with FILLER.

FIG. 13*c* shows an S-BCCH CONTINUE Frame (mandatory minimum), which is used for continuation of a Layer 3 message that was too long to fit into the previous frame. The continuation length indicator CLI field indicates how many bits of the CONTINUE frame belong to the continued message, and thus the preceding Layer 3 message may have to be padded with FILLER. If the BE indicator is set to "END", the rest of the CONTINUE frame is padded with FILLER. If the BE indicator is set to "BEGIN", a new Layer 3 message is started in the COTINUE frame. If the L3DATA field ends on an S-BCCH frame boundary, the BE indicator is not included in the frame; an "END" indication is implied. If the L3DATA field ends with less than nine bits remaining in the S-BCCH frame, the BE indicator is set to "END", and the rest of the frame is padded with FILLER.

The CLI makes it possible for mobile stations to receive any message starting in a continuation frame, even if the preceding logical frame was not received. The following table summarizes the fields included in the S-BCCH Layer 2 protocol frames.

| Field Name | Bit Length | Values |
| --- | --- | --- |
| SCS = S-BCCH Cycle Start | 1 | 0 = Not the start of an S-BCCH cycle<br>1 = Start of an S-BCCH cycle |
| BC = Begin / Continue | 1 | 0 = Begin<br>1 = Continue |
| CLI = Continuation Length Indicator | 7 | Number of bits remaining in previous Layer 3 message. |
| L3LI = Layer 3 Length Indicator | 8 | Variable length Layer 3 messages supported up to a maximum of 255 octets |
| L3DATA = Layer 3 Data | Variable | Contains a portion (some or all) of the Layer 3 message having an overall length indicated by L3LL. The portion of this field not used to carry Layer 3 data is filled with zeroes. |
| BE = Begin / End | 1 | 0 = Beginning<br>1 = End |
| FILLER = Burst Filler | Variable | All fiber bits are set zero |
| CRC = Cyclic Redundancy Code | 16 | Same generator polynomial as IS-54B. The nominal DVCC is applied in the calculation of CRC for each S-BCCH Layer 2 frame. |

Similar logical frames can be defined for the F-BCCH and E-BCCH, as described in U.S. patent application Ser. No. 08/147,254 for example, but these are beyond the scope of this application.

Layer 3 MESSAGES

The S-BCCH Layer 3 messages that are mapped to the Layer 2 frames are described below. In all messages shown in tabular form below, the information elements in the top rows of the tables are preferably the first elements to be delivered to Layer 2. In the information elements, the most significant bit (the left-most bit in the tables) is the first bit to be delivered to Layer 2. The information elements are described in alphabetical order after the description of the messages below.

There are two types of S-BCCH messages used for SMS broadcast: SMS frame header messages; and SMS non-header messages, which are those used to transfer the actual messages to the mobile stations.

The SMS frame header messages describe the structure of the SMS sub-channel, and are provided in the first slot of each SMS frame. The format of a suitable SMS frame header message is described in the following table.

| Information Element | Type | Bit Length |
| --- | --- | --- |
| Message Type | M | 8 |
| Number of Sub-channels | M | 2 |
| Sub-channel Number | M | 2 |
| Phase Length of Sub-ch. Cycle | M | 6 |
| Phase Number of Sub-ch. Cycle | M | 6 |
| Number of SMS Messages (N) | M | 6 |
| ° SMS Message ID (note 1) | M | 8 |
| ° Layer 2 Frame Start (Note 1) | M | 8 |
| | Total = | 46 |

NOTE 1: N instances of these two elements are sent consecutively.

The format of a suitable SMS non-header, broadcast message is as follows:

| Information Element | Type | Bit Length |
|---|---|---|
| Message Type | M | 8 |
| SMS Message ID | M | 8 |
| Text Message Data Unit | M | N*8 |
| | | N max. = 253 |

In one aspect of Applicants' invention, SMS messages may be encrypted in a way that supports different classes of message service, much like cable television systems distinguish premium classes of service from a basic service class by scrambling or otherwise protecting the premium programming. For example, three classes might be provided as follows: a basic class in which any subscriber paying an appropriate fee would be able to de-crypt some of the SMS broadcast messages, such as product advertisements, weather and vehicle traffic announcements; a higher class in which a subscriber paying a higher fee would be able to de-crypt the SMS broadcast messages available to the basic class and additional messages, such as news items; and a highest class in which a subscriber paying a highest fee would be able to decrypt all of the SMS broadcast messages, including financial quotations and higher-value items of information.

The de-cryption of the SMS messages could be carried out by the processing units in the mobile stations according to any of a wide variety of cryptographic techniques. Preferably, each broadcast message would include as an attribute an indicator for determining which encryption key or algorithm should be used to decode the respective message. Such attributes might be included in the SMS frame headers, and the encryption keys or algorithms could be sent to the mobiles over the air or entered directly, via a "smart card", for example. As an alternative, the sub-channels could be individually encrypted, so that broadcast SMS messages included in the time slots of one of the SMS sub-channels are encrypted according to one encryption method and the broadcast SMS messages included in the time slots of another SMS sub-channel are encrypted according to a another encryption method.

INFORMATION ELEMENT DESCRIPTION

A few coding rules apply to the information element descriptions. For example, information elements of the type "flag" have values of 0 to indicate "disable", or "off", or "false", and values of 1 to indicate "enable", or "on", or "true". Also, certain BCCH fields do NOT trigger a transition in the BCCH change flag in the SPACH; those fields are designated as non-critical, or "NC". Information elements of the type "transition" are modulo-1 counters for indicating changes in current status. The channel number is coded in accordance with the IS-54B standard, unless otherwise noted. All lengths are specified in bits, unless otherwise noted.

Layer 2 Frame Start

This variable indicates the number of slots from the start of the SMS sub-channel cycle to the beginning of the SMS message, which may not begin in the indicated SMS slot but may be contained in an end/begin burst used to start delivery of this message.

Message Type

This 8-bit information element identifies the function of the message being sent. The message types are coded as follows:

| S-BCCH Messages | Code (binary-hex) |
|---|---|
| Broadcast Information Message | 0010 0111 - 27 |

Number of SMS Messages

This variable indicates the number of broadcast SMS messages in this SMS frame (1 plus the value in this field).

Number of Sub-channels

This variable indicates the number of SMS sub-channels being used by this DCCH (1 plus the value in this field).

Phase Length of Sub-ch. Cycle

This variable indicates the number of SMS frames that make up one cycle (1 plus the value in this field).

Phase Number of Sub-ch. Cycle

This variable indicates which SMS frame in the cycle is currently being broadcast.

Sub-channel Number

This variable indicates which sub-channel is currently being broadcast.

According to another exemplary embodiment, the amount of bandwidth per sub-channel (i.e., the periodicity at which each sub-channel is transmitted) and the ordering of sub-channels is dynamic to provide additional flexibility to broadcast SMS systems. Although the term "sub-channels" is used herein, those skilled in the art will appreciate that any other term or phrase which connotes logical grouping of SMS messages could be used to describe these groupings of the present invention. Moreover, according to this exemplary embodiment, a greater number of SMS sub-channels, e.g., 8, 16, 32, 64, etc., can be supported than the four sub-channels used to illustrate the previous exemplary embodiment. For the purposes of illustration, rather than limitation, an example will be provided wherein up to 32 S-BCCH sub-channels are supported.

According to this exemplary embodiment, a particular subset of message attributes is associated with each sub-channel rather than broadcasting messages having any set of attributes on any sub-channel, as in the previous exemplary embodiment. The particular order in (and periodicity at) which these sub-channels are transmitted can be varied by the system operator according to, for example, the number of messages which have the attribute(s) associated with each sub-channel. The system can broadcast messages using associated with a sub-channel on, for example, a number of contiguous S-BCCH time slots, which number may vary for each sub-channel. The broadcasting of a sub-channel may, however, be interrupted by the system in order to broadcast messages on sub-channels 0 and 1 for reasons that will become apparent.

Since sub-channeling according to this exemplary embodiment does not have a fixed, time multiplexed format such as that provided in the earlier embodiment, a different mechanism (i.e., other than an SMS frame header) is used to provide overhead information. In this example overhead information including, for example, the total number of sub-channels currently activated, the message encryption algorithm associated with each sub-channel (if any), the user group associated with each sub-channel (if any), and other S-BCCH attributes described below, is provided on sub-channel 0. Channel 0 is dedicated to this overhead function so that mobile stations will know where to find this information. When a cycle of sub-channel 0 information is to be sent by the system (e.g., broadcast from a base station), it can be started in a first S-BCCH time slot coincident with a hyperframe counter value of zero. For example, sub-channel 0 can be broadcast at least once every 12*N hyperframes (N=1,2,3 . . . ) or when otherwise desired by a system operator. Once started, the broadcast of sub-channel 0 should be completed without interruption using consecutive S-BCCH time slots.

Sub-channel 1 is dedicated, according to this exemplary embodiment, to the provision of messages associated with other sub-channels (i.e., sub-channels 2-31 in this example) that have recently been changed or added. Typically, deleted messages are of no interest to mobile stations, however, those skilled in the art will recognize that the present invention can be readily extended to provide an indication to mobile units that a message has been deleted in a manner similar to that described herein for changed messages and added messages. The broadcast of sub-channel 1 by the system may commence after the completion of any sub-channel or by interrupting a sub-channel (other than sub-channels 0 or 1). For example, it may be considered desirable by a system operator to begin increase the periodicity of transmission of sub-channel 1 after the transmission of sub-channel 0 in which a change or changes have been indicated. Once the broadcast of sub-channel 1 has begun, it should be completed without interruption using consecutive S-BCCH time slots. By reading sub-channel 1, a mobile station will be able to quickly access changed or added messages of interest.

From the mobile station's perspective, upon camping on a DCCH the mobile can, for example, read sub-channel 0 to determine if it needs to acquire the S-BCCH information broadcast thereon that is associated with that particular DCCH. For example, after cell reselection, the mobile may have camped on a DCCH whose S-BCCH has a different structure in terms of the number of sub-channels currently activated, the user groups and/or encryption techniques associated with each sub-channel, etc. In such a case, the mobile would need this information in order to perform additional SMS activities supported by that DCCH. The selective acquisition of S-BCCH information is supported by, for example, a broadcast domain indicator provided as part of a Layer 3 message transmitted on sub-channel 0. This broadcast domain indicator is discussed in more detail below. For example, a mobile station reading sub-channel 0 may determine that it has locked to a DCCH associated with the same broadcast domain under which that mobile was previously operating, i.e., if the broadcast domain value read by the mobile station is the same as that previously read and stored, but where some changes have occurred in the S-BCCH information. In such a situation, the mobile station may need to read only the S-BCCH information which has changed since certain sub-channeling structure will be common to cells which support the same broadcast domain. More detailed examples describing of the interaction between a mobile station reading sub-channel 0 and the broadcast domain indicator will be provided after a description of the Layer 2 protocols and Layer 3 messages.

While in the process of acquiring the S-BCCH information broadcast on sub-channel 0, this information could be changed by the system, e.g., to add a new sub-channel to handle messages sent to a new user group and/or using a different encryption algorithm. Similarly, the S-BCCH information associated with a DCCH can change after it is acquired by a mobile station. In either case a Layer 2 change indication is sent to the mobile which responds by reading sub-channel 0. For example, a change notification bit can be placed in the SPACH header and used to notify mobile stations of changes in the content of the S-BCCH information. For a detailed description of the SPACH and SPACH header, the interested reader is referred to U.S. patent application Ser. No. 08/331,816 entitled "Layer 2 Protocol in Cellular Communication System" filed on Oct. 31, 1994, which disclosure is incorporated here by reference.

According to this exemplary embodiment, and as distinguished from the transition flags TF(i), change indication is generic in the sense that the particular sub-channel or sub-channels which have been modified are not identified in the Layer 2 change notification. Instead, the affected mobile stations will read sub-channel 0 to determine the specific sub-channel or sub-channels which have been modified. In this way the modified S-BCCH information can be sent to the mobile stations beginning in the hyperframe immediately following the hyperframe in which the Layer 2 change indication is provided.

The exemplary Layer 2 protocol defined below supports S-BCCH operation to allow a mobile station to uniquely determine the start and end of a sub-channel and to begin reading a sub-channel starting with any Layer 2 frame belonging to that sub-channel. According to this exemplary embodiment, each sub-channel is sent using up to 256 Layer 2 frames. Of course, those skilled in the art will appreciate that other sub-channel capacities can be used without departing from the spirit of the present invention. An exemplary 256 Layer 2 frame sub-channel would, however, provide about 10 maximum length (i.e., 255 octets) Layer 3 messages per sub-channel or about 25 SMS messages per S-BCCH sub-channel assuming an average of 100 octets of data per message. In this exemplary embodiment, a Layer 3 message qualifier can be used to identifies up to, for example, 256 distinct S-BCCH Payload messages over all of the SMS "traffic" sub-channels 2–31. Additional S-BCCH messages can be identified by creating other types of Layer 3 messages and pairing the associated Layer 3 message type with the Layer 3 message qualifier e.g., 256 different S-BCCH messages per pair. Having provided an overview of message delivery in accordance with this second exemplary SMS embodiment, exemplary Layer 2 and Layer 3 protocols for supporting these functions will now be described.

S-BCCH LAYER 2 PROTOCOL (Second Exemplary Embodiment)

The S-BCCH Layer 2 protocol is used when a TDMA slot is used to carry S-BCCH information. The S-BCCH protocol allows for supporting up to a maximum of 32 distinct S-BCCH sub-channels. The set of layer 3 messages comprising a S-BCCH sub-channel is sent using up to 256 S-BCCH layer 2 protocol frames.

Each S-BCCH Layer 2 protocol frame can be constructed to fit within a 125 bit envelope. An additional 5 bits are reserved for use as tail bits resulting in a total of 130 bits of information carried within each S-BCCH slot. The Layer 2 protocol defined in this exemplary embodiment for S-BCCH operation supports only unacknowledged operation. FIGS. 14(a)–14(e) provide examples of Layer 2 S-BCCH frames.

The BEGIN frame is used for starting the delivery of one or more Layer 3 messages on any given sub-channel of the S-BCCH. The Layer 3 that constitutes the opening message of a full cycle of S-BCCH information for any sub-channel shall be transmitted starting with a BEGIN FRAME and shall occupy the first L3DATA field included in the BEGIN frame should more than one L3DATA field be present therein. Exemplary rules for the placement of Layer 3 messages within a BEGIN frame are as follows.

If a Layer 3 message fits entirely within the L3DATA field of a BEGIN frame with 9 or more bits remaining in the frame, the Begin Indicator (BI) is included immediately after the L3DATA field to indicate whether or not an additional Layer 3 message is started within the frame. If BI=0, no other Layer 3 message is started and the rest of the frame is padded with FILLER. If BI=1 a L3LI field is included immediately after the BI field. The L3LI field is then followed by another L3DATA field containing a portion of the new Layer 3 message determined by the number of bits remaining in the frame.

If, on the other hand, a Layer 3 message fits entirely within the L3DATA field of a BEGIN frame with from 1 to 8 bits remaining in the frame and another Layer 3 message is to be sent, BI=0 is included immediately after the L3DATA field. The rest of the frame is then padded with FILLER and the next Layer 3 message is sent staring with another BEGIN frame. If a Layer 3 message fits entirely within the L3DATA field of a BEGIN frame with from 1 to 8 bits remaining in the frame and no other Layer 3 message is to be sent, BI=0 is included immediately after the L3DATA field and the rest of the frame is padded with FILLER. If a Layer 3 message fits entirely within the L3DATA field of a BEGIN frame with no bits remaining, the BI field is not present and the end of the Layer 3 message is implied. This case is exemplified in FIG. 14a.

Lastly, if a Layer 3 message does not fit entirely within the L3DATA field of a BEGIN frame, it is completed using as many CONTINUE frames as necessary. The other fields illustrated in FIG. 14a are described in Table 1 below.

The CONTINUE frame is used whenever a Layer 3 message cannot be completed within the previous S-BCCH Layer 2 frame. Exemplary CONTINUE frames are illustrated in FIGS. 14b–14d. The CLI field indicates how many bits of the CONTINUE frame belong to the continued Layer 3 message. This in turn allows for mobile stations to receive a portion of a new message which may be present in the CONTINUE frame following the L3DATA field used to complete a message continued from the previous frame. Exemplary rules for the placement of Layer 3 message information within a CONTINUE frame are as follows.

If the CLI field indicates that the remainder of a continued Layer 3 message fits entirely within the CONTINUE frame with 9 or more bits remaining in the frame, the Begin Indicator (BI) is included immediately after the L3DATA field to indicate whether or not an additional Layer 3 message is started within the frame. For example, if BI=0 no other Layer 3 message is started and the rest of the frame is padded with FILLER. This case is illustrated as FIG. 14b. If BI=1, then an L3LI field is included immediately after the BI field. The L3LI field is then followed by another L3DATA field containing a portion of the new Layer 3 message. The length of the portion of the new Layer 3 message in the second L3DATA field is determined by the number of bits remaining in the frame. This case is illustrated in FIG. 14c.

If CLI indicates that the remainder of a continued Layer 3 message fits entirely within the CONTINUE frame with from 1 to 8 bits remaining in the frame and another Layer 3 message is to be sent, BI=0 is included immediately after the L3DATA field. The rest of the frame is padded with FILLER and the next Layer 3 message is sent starting with another BEGIN frame. This case is also exemplified by the format of FIG. 14b.

If CLI indicates that the remainder of a continued Layer 3 message fits entirely within the CONTINUE frame with from 1 to 8 bits remaining in the frame and no other Layer 3 message is to be sent, BI=0 is included immediately after the L3DATA and the rest of the frame is padded with FILLER. If CLI indicates that the entire CONTINUE frame contains information belonging to a continued Layer 3 message, the BI field is not present in the frame. This is illustrated in FIG. 14d.

A continued Layer 3 message is completed using as many CONTINUE frames as necessary. The following table summarizes the exemplary fields provided in these S-BCCH Layer 2 frames according to this exemplary embodiment.

TABLE 1

S-BCCH Layer 2 Protocol Field Summary

| FIELD NAME | LENGTH (Bits) | VALUES |
| --- | --- | --- |
| BC = Begin/Continue | 1 | Identifies the type of L2 frame (0 = Begin, 1 = Continue) |
| SID = Sub-channel ID | 5 | Uniquely identifies the sub-channel that a L2 frame belongs to (0..31). |
| FDC = Frame Down Counter | 8 | Uniquely identifies a Layer 2 frame used in sending a cycle of sub-channel information (0..255). |
| SSI = Sub-channel Start Indicator | 1 | Indicates whether or not a L2 frame is the first frame used in sending a cycle of sub-channel information (0 = No, 1 = Yes). |
| SCN = S-BCCH Change Notification | 1 | Transitions whenever there is a change in the content of S-BCCH information. A mobile station responds by reading S-BCCH information on sub-channel 0. |
| CLI = Continuation Length Indicator | 7 | Number of bits in the current L2 frame used to carry information from a previously initiated L3 message. |
| L3LI = Layer 3 Length indicator | 8 | Variable length Layer 3 messages supported from 0 up to a maximum of 255 octets. |
| L3DATA = Layer 3 Data | Variable | Contains a portion (some or all) of the Layer 3 message having an overall length as indicated by L3LI. The portion of this field not used to carry Layer 3 information is filled with zeros. |
| BI = Begin Indicator | 1 | 0 = No additional Layer 3 message present 1 = Additional Layer 3 message present |
| FILLER = Burst Filler | Variable | All filler bits are set to zero. |
| CRC = Cycle Redundancy Code | 16 | Same generator polynomial as IS-54B. The nominal DVCC is applied in the calculation of CRC for each S-BCCH Layer 2 frame. |

An S-BCCH Request primitive can be provided to transfer Layer 3 messages to be sent on the S-BCCH to Layer 2. For example, the S-BCCH Request primitive can include the following protocol elements:

(1) a Layer 3 message (examples below);
(2) a Layer 3 Length Indicator (L3LI) providing the length of the Layer 3 message (e.g., in octets); and
(3) a sub-channel ID which identifies the sub-channel that the Layer 3 message is associated with.

LAYER 3 MESSAGES (Second Exemplary Embodiment)

Exemplary Layer 3 messages which can be mapped to Layer 2, e.g., using the primitive described above are set forth below. As in the description of the previous exemplary embodiment, the information elements in the top rows of tables can be the first elements delivered to Layer 2. In the information elements, the most significant (i.e., leftmost) bit is the first bit to be delivered to Layer 2. The information elements are described in alphabetical order after the description of the message below.

A Sub-channel Configuration message is sent on sub-channel 0 to define the format of supported channels. An exemplary format for the Sub-channel Configuration message is illustrated below.

| Information Element | Reference | Type | Length |
| --- | --- | --- | --- |
| Protocol Discriminator | | M | 2 |
| Message Type | | M | 6 |
| Sub-channel Count (N) | | M | 5 |
| Sub-channel Info (Note 1) | | O | 13–* |

Note 1: N instances of this information element are included up to a maximum number of supported "traffic" subchannels, e.g., 30.

The Sub-channel Count information element identifies the number of sub-channels used in support of sending S-BCCH information. In this exemplary embodiment five bits are provided to support the 32 sub-channels. Of course more or fewer bits could be provided to represent this value if more or fewer sub-channels are to be supported, respectively.

The Sub-Channel Info information element identifies the attributes of supported S-BCCH sub-channels. An exemplary format for this information element is shown below.

| Field | Length |
| --- | --- |
| Sub-channel ID (Note 1) | 5 |
| MEA | 3 |
| MEK | 3 |
| Wildcard Indicator | 1 |
| Broadcast Mode | 1 |
| User Group Type (Note 2) | 0, 2 |
| User Group ID (Note 2) | 0, 20, 24, 34, or 50 |

Note 1: Sub-channels 0 and 1 are defined implicitly and therefore need not be explicitly defined.
Note 2: Only present if the Broadcast Mode indicates User Group ID specific broadcast.

Each of the fields of the Sub-channel Info information element and the attributes which they describe are set forth in more detail below.

The Sub-channel ID field identifies a specific S-BCCH sub-channel (0..31) associated with each of the other parameters in the information element. This field can be used by a mobile station as an index by which the mobile station can update its information as to the structure of certain sub-channels as needed, e.g., newly added sub-channels.

The MEA and MEK fields identify the encryption technique (if any) associated with the particular sub-channel identified by the sub-channel ID field. Encryption can, for example, be one of the message attributes upon which the grouping of messages into logical sub-channels can be based. The MEA field can, for example, be coded as follows.

| Value | Function |
| --- | --- |
| 000 | No Message Encryption |
| 001 | Message Encryption Algorithm A |
| All other values are reserved | |

The MEK field can, for example, be coded as follows.

| Value | Function |
| --- | --- |
| 001 | Message Encryption Key A |
| All other values are reserved | |

The combination of both an MEA and MEK can be used to provide, for example, different levels of service to publicly available channels. For example, different encryption algorithms could be associated with each encryption key to provide different levels of access to information. Thus, a Bronze class message group could be associated with a first encryption algorithm and an encryption key, a Silver class message group (i.e., sub-channel) could be associated with a second encryption algorithm and that encryption key, and a Gold class message group could be associated with a third encryption algorithm and that encryption key.

The Wildcard Indicator field indicates whether or not the sub-channel identified by the sub-channel ID field belongs to the broadcast domain. Each broadcast domain (e.g., each system operator) may have certain standard or common sub-channels. Other sub-channels, which are not common to a broadcast domain, may nonetheless be broadcast by the system. The mobile station learns of these non-standard sub-channels by reading the Wildcard Indicator. The Wildcard Indicator field can, for example, be coded as follows.

| Value | Function |
| --- | --- |
| 0 | Standard Sub-channel (part of Broadcast Domain) |
| 1 | Wildcard Sub-channel (not part of Broadcast Domain) |

The Broadcast Mode field indicates whether or not the sub-channel identified in sub-channel ID field is restricted to a particular user group. The Broadcast Mode field can, for example, be coded as follows.

| Value | Function |
| --- | --- |
| 0 | Unrestricted Broadcast |
| 1 | User Group ID Specific Broadcast |

The User Group Type and User Group D fields specify the user group to which this sub-channel is restricted if the appropriate value is set in the Broadcast Mode field. The User Group Type field can, for example, be coded as follows.

| Value | Function |
|---|---|
| 00 | 20-bit Local UGID |
| 01 | 24-bit SOC UGID |
| 10 | 34-bit National UGID |
| 11 | 50-bit International UGID |

The User Group Type field indicates, for example, how many bits to expect in the User Group ID field, which identifies the User Group to which an S-BCCH sub-channel has been allocated.

The Sub-channel Change Summary message is also sent on S-BCCH sub-channel 0 to indicate the nature of changes made to S-BCCH information. An exemplary format for this message is set forth below.

| Information Element | Reference | Type | Length |
|---|---|---|---|
| Protocol Discriminator | | M | 2 |
| Message Type | | M | 6 |
| Broadcast Domain ID | | M | 8 |
| Change Indicator Map | | M | 32 |
| Change Acquisition Map | | M | 32 |

The Broadcast Domain ID information element is used to identify, for example, a system operator code (SOC) specific S-BCCH broadcast area as described above. More specifically, the Broadcast Domain ID provides an indication to a mobile station of whether certain commonalities expected within a broadcast domain are available to that mobile station when the mobile station locks on to another DCCH. For example, adjacent DCCHs that have the same SOC and that send the same set of S-BCCH information on the same standard sub-channels shall use the same Broadcast Domain ID value.

The Change Indicator Map information element is used to provide change indication information on a per sub-channel basis. The leftmost bit in this map corresponds to sub-channel 31 and the rightmost bit corresponds to sub-channel 0. Whenever there is a modification to the content of a sub-channel (other than a deletion) the corresponding bit position in this map is toggled. Mobile stations need only proceed to acquire the new S-BCCH information for the modified sub-channels that are of interest, e.g., according to the Change Acquisition Map element described below.

The Change Acquisition Map information element is use to provide change acquisition information on a per sub-channel basis. The leftmost bit in this map corresponds to sub-channel 31 and the rightmost bit corresponds to sub-channel 0. Whenever there is a modification to the content of a sub-channel (other than a deletion) the corresponding bit position in this map is used to inform mobile stations how to acquire the new information as follows. When a bit of this map is set to 0, then mobile stations that have previously read the newly modified sub-channel associated with that bit shall acquire the new information by reading sub-channel 1. Mobile stations that are in the process of reading or have never read the newly modified sub-channel shall acquire the new information by (re-)reading a full cycle of information from the modified sub-channel. When a bit of this map is set to 1, mobile stations shall acquire the new information by reading a full cycle of information from the newly modified sub-channel.

The S-BCCH Payload message is sent on sub-channels 1 through 31 in order to provide the Layer 3 messages specific to S-BCCH operation and can, for example, have the following format.

| Information Element | Reference | Type | Length |
|---|---|---|---|
| Protocol Discriminator | | M | 2 |
| Message Type | | M | 6 |
| Message Type Qualifier | | M | 8 |
| Other Data (TBD) | | TBD | TBD |

The Message Type information element identifies the function of the message, e.g., an S-BCCH Payload message. The Message Type Qualifier information element is used to identify up to 256 distinct S-BCCH messages. For example:

| Value | Function |
|---|---|
| 0000 0000 | Casino Clips |
| 0000 0001 | Road Report |
| 0000 0010 | Rugby News |
| All other values are reserved. | |

The Other Data (TBD) field can be used to provide, e.g., higher layer protocols such as how long a message should be retained for retransmission on a sub-channel.

The Sub-channel Delimiter message can be sent on sub-channel 1 to delimit groups of S-BCCH Payload messages, also sent on sub-channel 1, that are associated with specific sub-channels. This allows mobile stations to determine the nominal sub-channels that each S-BCCH Payload message is associated with. The Sub-channel Delimiter message can, for example, have the following format.

| Information Element | Reference | Type | Length |
|---|---|---|---|
| Protocol Discriminator | | M | 2 |
| Message Type | | M | 6 |
| Sub-channel ID | | M | 5 |

Having described exemplary Layer 3 messages, the operation of a mobile station in such a system will now be described by way of several examples. As mentioned above, a mobile station that acquires a new DCCH (e.g., by cell reselection) shall perform an S-BCCH update by first reading sub-channel 0 to determine if the S-BCCH information associated with this DCCH is different. For example, assume that the mobile station has travelled to a cell whose DCCH is associated with another broadcast domain (e.g., a different system operator). Under these circumstances, the mobile station will read a full cycle of information on all sub-channels determined to be of interest according to sub-channel 0 information. Subchannels of interest can, for example, include those sub-channels whose encryption techniques match those which the mobile station can decrypt and/or those sub-channels accessible to a common user group supported by the mobile station.

As another example, consider a mobile station which is informed, by a change in the notification flag found in the SPACH header, that the contents of the S-BCCH have changed. Suppose, for this example, that the change constitutes the addition of a new sub-channel. The mobile station will then read sub-channel 0. If it first receives a Subehannel Change Summary message, the mobile station will learn, from the setting of a bit in the Change Indicator Map information element, that a new sub-channel has been added. However, the mobile station will not know, based on this message, whether or not this is a sub-channel of interest, since the Subchannel Change Summary message does not provide an indication of the sub-channel attributes associated with the newly added sub-channel. Accordingly, the mobile will read a Subchannel configuration message to determine if it is interested in the new sub-channel and read a cycle of that sub-channel as desired.

As another example, consider a mobile station that is informed of a change in S-BCCH information via the S-BCCH change notification flag carried in the SPACH header. Suppose, for this example, that the change constitutes the modification of a single message sent on a specific sub-channel of interest to the mobile station. The mobile station responds to the change notification by first reading sub-channel 0 to acquire the Sub-channel Change Summary message. The Change Indicator Map information element contained within this message identifies that only a single sub-channel has changed. A bit position in the Change Indicator Map information element and its corresponding value serves to uniquely identify the changed sub-channel. The Change Acquisition Map information element, also contained within this message, indicates how the changed information is to be acquired for the changed sub-channel identified. For this example, assume that the bit position in the Change Acquisition Map information element corresponding to the changed sub-channel indicates that sub-channel 1 should be read to acquire the changes associated with the changed sub-channel. The mobile station then proceeds to read a full set of information sent on sub-channel 1 (in this example only a single S-BCCH Payload message since only one sub-channel has changed) and updates its S-BCCH information accordingly.

Although the present invention has been described in terms of attributes such as types of encryption and user group assignment, those skilled in the art will appreciate that other types of attributes can be added or substituted for those described herein. Moreover, other broadcast SMS embodiments will also be apparent to those skilled in the art as being within the scope of the present invention without a detailed description thereof. For example, sub-channel 1 need not be dedicated to carry change information. Instead, additional segmentation can be provided at Layer 2 whereby strings of Layer 2 frames are also defined to allow guaranteed delivery of these distinct strings without interruption (unless aborted) while still allowing for a fast real time response to information change situations.

Another technique would be to provide only a single (large) payload sub-channel used for carrying the full set of broadcast information rather than the exemplary sub-channels 2 . . . 32 described above. Changes could still be carried on sub-channel 1 and sub-channel 0 could still contain sub-channel structure and detailed change indication information. Message encryption and user group operation would then be specified on a per BCCH message basis.

Moreover, although these illustrative embodiments describe a mobile station that first reads sub-channel 0 upon receiving a change notification, those skilled in the art will appreciate that the mobile station could vary this procedure. For example, sub-channel 1 could be read first by the mobile station to determine which messages have changed. A change flag could be provided on sub-channel 1 to indicate whether or the information on sub-channel 0 has changed, at which point the mobile station could then acquire the S-BCCH information of sub-channel 0.

It is, of course, possible to embody the invention in specific forms other than those described above without departing from the spirit of the invention. The embodiments described above are merely illustrative and should not be considered restrictive in any way. The scope of the invention is determined by the following claims, rather than the preceding description, and all variations and equivalents which fall within the scope of the claims are intended to be embraced therein.

What is claimed is:

1. A method of transmitting information in a radiocommunication system comprising the steps of:

grouping the information into a plurality of successive time slots on a radio carrier signal, wherein the information includes special messages;

grouping the time slots into a plurality of successive superframes;

designating one or more time slots of each of the successive superframes as a logical special message channel;

grouping the one or more time slots of the logical special message channel into a plurality of successive special messaging superframes;

grouping said special messages as a plurality of logical sub-channels, wherein each sub-channel comprises at least a portion of one or more superframes of said plurality of special messaging superframes;

selectively ordering said sub-channels; and transmitting said sub-channels in said selected order over said logical special message channel.

2. The method of claim 1, wherein at least one sub-channel of said plurality of sub-channels includes a configuration message that defines format information of said plurality of sub-channels.

3. The method of claim 2, wherein said format information of said configuration message further includes a plurality of sub-channel information elements that identify attributes of said plurality of sub-channels.

4. The method of claim 3, wherein each of said plurality of sub-channel information elements includes a sub-channel identification sub-element.

5. The method of claim 4, wherein each of said plurality of sub-channel information elements includes at least one encryption sub-element, wherein said at least one encryption sub-element identifies an encryption technique associated with the sub-channel identified by said sub-channel identification sub-element.

6. The method of claim 4, wherein each of said plurality of sub-channel information elements includes a wildcard indicating sub-element that indicates whether a sub-channel identified by said identification sub-element belongs to a broadcast domain.

7. The method of claim 4, wherein each of said plurality of sub-channel information elements includes a broadcast mode sub-element that indicates whether a sub-channel identified by said identification sub-element is restricted to at least one particular user group.

8. The method of claim 4, wherein each of said plurality of sub-channel information elements includes at least one user group sub-element that identifies the user group allocated to the sub-channel identified by said identification sub-element.

* * * * *